(12) United States Patent
Mallipeddi et al.

(10) Patent No.: US 12,530,372 B2
(45) Date of Patent: *Jan. 20, 2026

(54) ASYNCHRONOUS CROSS-REGION BLOCK VOLUME REPLICATION

(71) Applicant: Oracle International Corporation, Redwood Shores, CA (US)

(72) Inventors: Venkata Harish Mallipeddi, Bellevue, WA (US); Travis John Portz, Seattle, WA (US); Jeppe Oskar Meyer Larsen, Sammamish, WA (US); Mario Tayah, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/657,616

(22) Filed: May 7, 2024

(65) Prior Publication Data

US 2024/0338385 A1 Oct. 10, 2024

Related U.S. Application Data

(63) Continuation of application No. 17/964,643, filed on Oct. 12, 2022, now Pat. No. 12,001,453, which is a
(Continued)

(51) Int. Cl.
*G06F 16/27* (2019.01)
*G06F 11/14* (2006.01)

(52) U.S. Cl.
CPC ........ *G06F 16/273* (2019.01); *G06F 11/1469* (2013.01); *G06F 2201/84* (2013.01)

(58) Field of Classification Search
CPC .... G06F 16/2365; G06F 16/275; G06F 16/27; H04L 9/0643; H04L 2209/34
See application file for complete search history.

(56) References Cited

U.S. PATENT DOCUMENTS

| 11,036,594 B1 | 6/2021 | Shats et al. |
| 2003/0158861 A1 | 8/2003 | Sawdon et al. |

(Continued)

FOREIGN PATENT DOCUMENTS

| JP | 2005-165618 A | 6/2005 |
| JP | 2015-056130 A | 3/2015 |

(Continued)

OTHER PUBLICATIONS

International Application No. PCTUS2021/052600, "International Search Report and Written Opinion", dated Jan. 31, 2022, 15 pages.
(Continued)

*Primary Examiner* — Apu M Mofiz
*Assistant Examiner* — Cindy Nguyen
(74) *Attorney, Agent, or Firm* — Invoke

(57) ABSTRACT

Techniques are provided for cross-region replication of block volume data. The techniques include a method wherein a computer system implements operations including creating a first snapshot of a block volume at a first geographic region and at a first logical time, the block volume including a plurality of partitions, transmitting first snapshot data to an object storage system at a second geographic region, creating a second snapshot of the block volume at the first geographic region and at a second logical time, generating a plurality of deltas, transmitting a plurality of delta data sets corresponding to the plurality of deltas to the object storage system at the second geographic region, generating a checkpoint at least in part by aggregating object metadata associated with the plurality of deltas and the first snapshot, receiving a restore request to generate a restore volume, and generating the restore volume from the checkpoint.

20 Claims, 16 Drawing Sheets

Related U.S. Application Data continuation of application No. 17/091,635, filed on Nov. 6, 2020, now Pat. No. 11,537,633.

(56) References Cited

U.S. PATENT DOCUMENTS

| | | |
|---|---|---|
| 2005/0154937 A1 | 7/2005 | Achiwa |
| 2010/0058010 A1 | 3/2010 | Augenstein et al. |
| 2017/0185323 A1 | 6/2017 | Kaushik et al. |
| 2017/0235950 A1 | 8/2017 | Gopalapura et al. |
| 2019/0095289 A1 | 3/2019 | Kumar et al. |
| 2019/0332267 A1 | 10/2019 | Muniswamy-Reddy et al. |
| 2019/0332269 A1 | 10/2019 | Greenwood et al. |
| 2021/0096960 A1* | 4/2021 | Kumar .................. G06F 3/0617 |
| 2021/0157694 A1* | 5/2021 | Dye .................... G06F 11/2023 |
| 2021/0286760 A1 | 9/2021 | Aldred et al. |
| 2022/0083245 A1 | 3/2022 | Kant et al. |

FOREIGN PATENT DOCUMENTS

| | | |
|---|---|---|
| KR | 10-2003-0066331 A | 8/2003 |
| KR | 10-2004-0080429 A | 9/2004 |
| KR | 10-2015-0087622 A | 7/2015 |
| WO | 01/97030 A1 | 12/2001 |
| WO | 2017/064770 A1 | 4/2017 |

OTHER PUBLICATIONS

U.S. Appl. No. 17/091,635, "First Action Interview Pilot Program Pre-Interview Communication", dated May 26, 2022, 4 pages.

U.S. Appl. No. 17/091,635, "Notice of Allowance", mailed Jul. 27, 2022, 15 pages.

\* cited by examiner

ASYNCHRONOUS CROSS-REGION BLOCK VOLUME REPLICATION

INCORPORATION BY REFERENCE; DISCLAIMER

Each of the following applications are hereby incorporated by reference: application Ser. No. 17/964,643, filed on Oct. 12, 2022; application Ser. No. 17/091,635, filed on Nov. 6, 2020. The applicant hereby rescinds any disclaimer of claims scope in the parent application(s) or the prosecution history thereof and advises the USPTO that the claims in the application may be broader than any claim in the parent application(s).

BACKGROUND

Cloud-based platforms provide scalable and flexible computing resources for users. Such cloud-based platforms, also referred to as infrastructure as a service (IaaS), may offer entire suites of cloud solutions around a customer's data, for example, solutions for authoring transformations, loading data, and presenting the data. In some cases, customer data may be stored in block volume storage and/or in object storage in a distributed storage system (e.g., cloud storage).

BRIEF SUMMARY

Techniques are provided (e.g., a method, a system, non-transitory computer-readable medium storing code or instructions executable by one or more processors) for asynchronous cross-region block volume replication.

In an embodiment, a method includes creating, by a computer system, a first snapshot of a block volume at a first geographic region and at a first logical time, the block volume comprising a plurality of partitions. The method includes transmitting, by the computer system, first snapshot data corresponding to the first snapshot to an object storage system at a second geographic region. The method includes creating, by the computer system, a second snapshot of the block volume at the first geographic region and at a second logical time. The method includes generating, by the computer system, a plurality of deltas, each delta of the plurality of deltas corresponding to a partition of the plurality of partitions. The method includes transmitting, by the computer system, a plurality of delta data sets corresponding to the plurality of deltas to the object storage system at the second geographic region. The method includes generating, by the computer system, a checkpoint at least in part by aggregating object metadata associated with the plurality of deltas and the first snapshot. The method includes receiving, by the computer system, a restore request to generate a restore volume. The method also includes generating, by the computer system, the restore volume from the checkpoint.

In a variation, generating the plurality of deltas includes generating a comparison between the second snapshot to the first snapshot. Generating the plurality of deltas may include determining, based on the comparison, modified data corresponding to changes between the first snapshot data and second snapshot data corresponding to the second snapshot. The plurality of deltas may describe the modified data for the plurality of partitions. Creating the first snapshot may include suspending input/output operations for the plurality of partitions, corresponding to a logical time, generating a plurality of block images describing volume data in the plurality of partitions, and enabling input/output operations for the plurality of partitions. The restore request may be or include a failover request, The method may further include enabling the restore volume to be generated at the second geographic region and enabling input/output operations using the restore volume at the second geographic region. The restore request may be or include a failback request, and the method may further include generating the restore volume at the second geographic region, enabling a failback volume to be generated at the first geographic region at least in part by cloning the restore volume, and restoring the first snapshot data at the first geographic region. Transmitting the plurality of delta data sets may include generating a plurality of chunk objects from the plurality of delta data sets, transferring the plurality of deltas, and transferring the plurality of chunk objects to the object storage system. The checkpoint may include a manifest of the object metadata. The object metadata may include chunk pointers corresponding to the plurality of chunk objects in the object storage system. Aggregating the object metadata may include updating the manifest to reflect a plurality of differences between the plurality of delta data sets and the first snapshot data.

In certain embodiments, a computer system includes one or more processors and a memory in communication with the one or more processors, the memory configured to store computer-executable instructions, wherein executing the computer-executable instructions causes the one or more processors to perform one or more of the steps of the method or its variations, described above.

In certain embodiments, a computer-readable storage medium stores computer-executable instructions that, when executed, cause one or more processors of a computer system to perform one or more steps of the method or its variations, described above.

Figure 1:
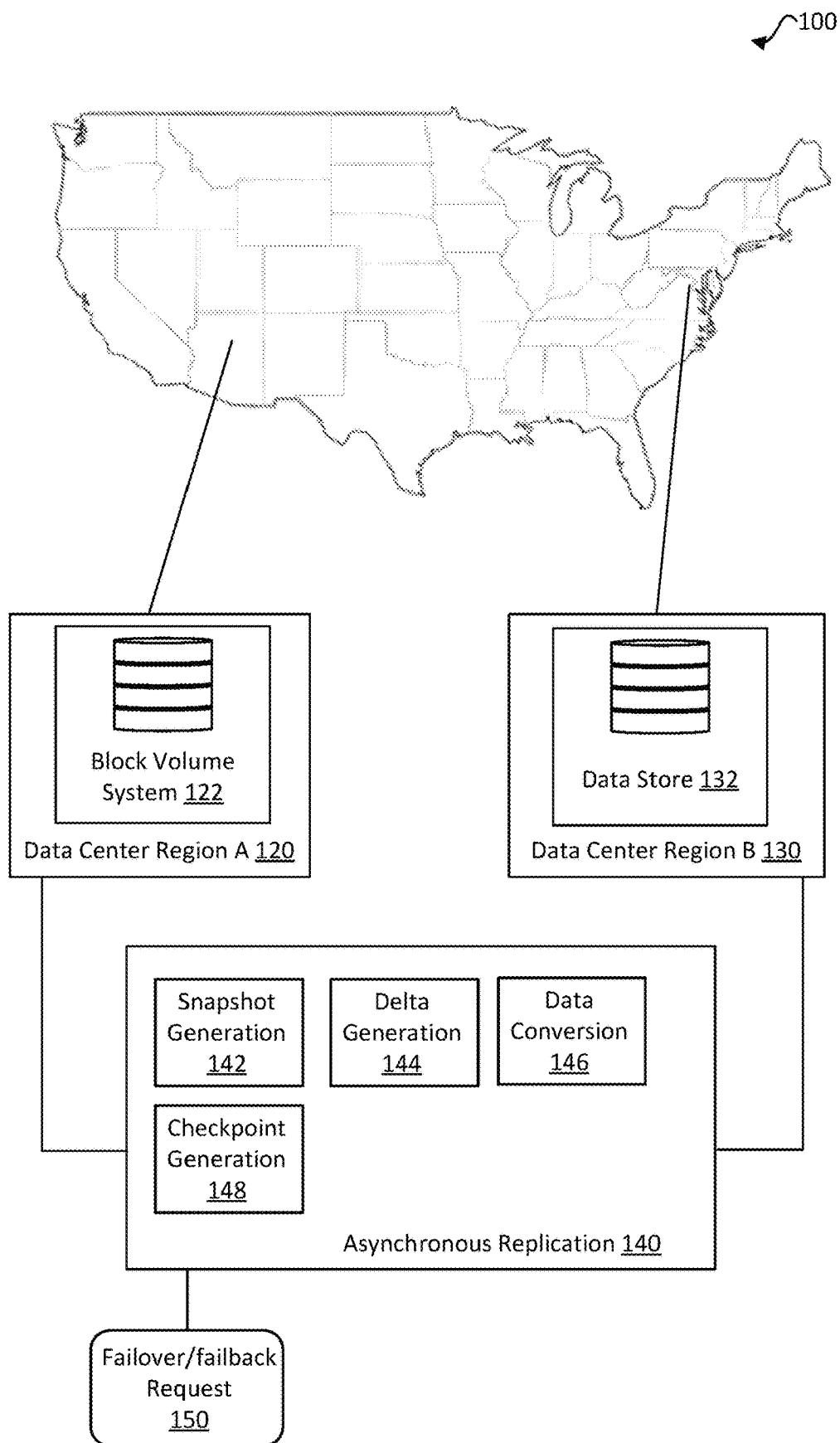
FIG. 1 illustrates an example system for asynchronous cross-region block volume replication, in accordance with one or more embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Cloud-based platforms provide scalable and flexible computing resources for users. Such cloud-based platforms, also referred to as infrastructure as a service (IaaS) may offer entire suites of cloud solutions around a customer's data, such as solutions for authoring transformations, loading data, and presenting the data. In some cases, customer data may be stored in block volume storage and/or in object storage in a distributed storage system (e.g., cloud storage). Customer data may be stored in a data center located in a geographic region, for example, as part of a global distributed storage system. A data center may be selected based at least in part on one or more performance metrics including latency, Input-Output operations per second (IOPS), throughput, cost, stability, etc. In some cases, the optimum location of the data center can correspond to the location of the customer (e.g., when the customer generates significant volumes of internal data). In some cases, the optimum location can correspond to the location of the customer's clients and/or users (e.g., when the customer operates a content delivery network).

Customer data may be copied to a backup system in a different geographic region or data center (also referred to as an availability domain, or "AD") to be recovered following a failure by designating the backup system as the primary system (referred to as a "failover"). Failover systems may be characterized by multiple metrics including recovery point objective (RPO), recovery time objective (RTO) and disaster recovery (DR). In general, RPO describes how much data may be lost during a failover, such that an objective of a backup system may be to minimize RPO. Typically, generating a backup copy involves taking a backup in one region, waiting for the backup to upload to a cloud system, then initiating a cross-region copy operation and waiting for the copy to complete in the destination region. Significant metadata overhead may be associated with each backup, which may increase computational demands and resource expense at high repetition rates. For this reason, RPO is typically available on the order of hours for a backup system (where time indicates a quantity of data when considered in light of average data transfer rates).

Similarly, RTO may be an important metric of a failover system, as it indicates the length of time involved to restore data after a failover. For a backup restored from a different geographical region, input-output operations may exhibit elevated latency over typical conditions until the volume is fully restored. What is more, restore times and the latency of on-demand data operations may increase significantly in response to a spike in system load, for example, corresponding to data traffic shifting in response to a region-wide failure. Latency may be further elevated while a distributed data storage system is also implementing a backup restoration from cross-region backup copies.

Customer data may be valuable, such that the customer may expect data to be protected by one or more approaches including, for example, data redundancy and infrastructure implemented to increase storage stability (e.g., such as power supply reinforcement, surge protection, etc.). Data redundancy may take multiple forms including, but not limited to, replicating customer data in local storage media (e.g., physical storage media), in the distributed storage system, and/or in a different distributed storage system. In some cases, the customer data may be replicated all at once, referred to as a backup. Such an approach may include significant latency in system input-output operations while the backup is taking place. For example, a storage system may freeze all reading and writing operations while a backup is underway to ensure that a complete duplicate of the customer data is preserved. In such cases, additional buffer capacity may be employed to temporarily store new data in the distributed storage system and/or customer data requests may be delayed.

In contrast to a backup of an entire volume, customer data may be replicated asynchronously, as described in more detail in reference to the figures, below. For example, customer data may be replicated on an ongoing basis (e.g., in intervals of minutes, as opposed to hours that may be typical of backup systems), at least in part by generating an object describing an incremental change in a sub-unit of a data storage system (e.g., a partition of a block volume system). In the following paragraphs, the object describing the incremental change is also referred to as a "delta." A delta, as described in more detail in reference to FIG. 1, may describe one or more changes to customer data between two asynchronous records. A record of the state of user data in a distributed storage system is also referred to as a "snapshot," and may represent the state of data at a single logical time, as opposed to a single chronological time, as described in more detail in reference to the figures, below. In some cases, deltas may be generated and may be stored and/or transferred/replicated as the deltas are generated. As such, asynchronous replication may permit customer data to be replicated by transferring deltas, rather than backups.

For at least these reasons, the techniques described herein present one or more advantages over data redundancy approaches relying on backup customer data. For example, generating multiple deltas to replicate changes to data subsequent to a snapshot may permit a data replication process to be subdivided in chronological time, and may reduce the impact of data replication on latency, IOPS and/or other performance metrics.

Approaches relying on backing up an entire volume may risk data loss if a system failure occurs at a time when the available backup does not reflect valuable changes to customer data (e.g., a failure occurs long after an existing backup is made, or significant changes to customer data have occurred since the last backup). Implementing asynchronous replication may also improve overall system performance, as well as potentially improving preservation of customer data. As such, asynchronous replication approaches may provide improved RPO, RTO, and DR, relative to backup systems.

As an illustrative example, a block volume system may be implemented in a distributed storage system having multiple data centers in multiple geographic regions around the world. Customer data stored in the block volume system in one of the data centers may be replicated in a second data center to protect against data loss in case the first data center experiences a catastrophic failure. The customer data may be replicated by generating both snapshots and deltas, where the snapshots may provide a holistic replication of the customer data across multiple partitions, and a delta may permit incremental tracking of changes to customer data for a single partition subsequent to the preceding snapshot. Once a delta is generated, it may be transferred to the second data center with the customer data it describes, which may be used by the storage system at the second data center to restore the customer data in case of a failure in the first data center. While a delta is being generated for one partition, other partitions may remain available for input-output operations and may permit the storage system at the first data center to maintain a desired level of performance. In the event of a failure at the first data center, the second data center may assume the role of the first data center (termed a "failover") and/or the customer data may be restored to the first data center, which may resume operation (termed a "failback").

FIG. 1 illustrates an example system 100 for asynchronous cross-region block volume replication, in accordance with one or more embodiments. As described above, the system 100 may facilitate data redundancy by replicating customer data from a source system to a destination system, for providing customer data during a failure recovery. In some embodiments, a first data center 120 (e.g., the source system) may store data in a block volume system 122. In some embodiments, the first data center 120 may store data in an object storage system, rather than a block volume system. The data may be generated and/or provided by a user of the first data center 120. The first data center 120 may be located in a first geographic region (e.g., Region A), that may be proximate to the location of the user and/or may correspond to one or more operational criteria such as, for example, performance metrics (e.g., latency, IOPS, throughput, cost, stability, etc.). In some cases, the possibility of interruptions in the regular operation of the first data center 120 (e.g., power failure, data corruption, distributed denial of service attack (DDOS), natural disasters, etc.) may pose a risk of data loss. To potentially reduce the risk of data loss, the data may be replicated in a second data center 130 (e.g., the destination system). In some embodiments, the second data center 130 may be located in a geographic region that is different from the location of the first data center 120, which may reduce the risk of data loss posed by natural disasters or infrastructure failures. Similarly, storing the data in a second data center 130, separate from the first data center 120, may reduce the potential vulnerability toward malicious actions (e.g., DDOS, data corruption, etc.) that could interrupt input-output operations and/or result in data loss by targeting the first data center. As described in more detail, below, the second data center 130 may store the data in a data store 132 as a standby volume, object storage, and/or other storage formats (e.g., based on customer configuration and/or preferences).

In some embodiments, the data stored in the first data center 120 may be replicated in the second data center 130 via an asynchronous replication 140 system. As described above, asynchronous replication may provide technical advantages over periodic backup replication, in that it may represent a reduced interruption of normal input-output processes when restoring operation (e.g., RTO) and may reduce the extent of data loss caused by disruption at the first data center 120 (e.g., RPO). In some embodiments, the asynchronous replication 140 may include generating and transferring replicated data from the first data center 120 to the second data center 130 in increments, rather than as a coherent backup image generated at a particular chronological time, which may be periodically replaced by a new backup image. Instead, as described in more detail in reference to FIG. 2, below, the asynchronous replication 140 may dynamically update data stored in the second data center 130, for example, by generating and transferring data and/or records of changes in the data stored in the first data center 120. In some embodiments, a customer and/or user of the block volume system 122 may configure the asynchronous replication 140 at the time the constituent volumes are created and/or as a subsequent option available after the block volume system 122 is already operating as a distributed data storage system. In some embodiments, configuring the asynchronous replication 140 may include designating a destination region (e.g., the second geographic region, "Region B"). In some embodiments, for example, when the replicated data is to be stored in a standby block volume system, configuring the asynchronous replication 140 may include designating a destination AD within the destination region.

In some embodiments, the asynchronous replication 140 may include a snapshot generation 142 sub-system, which may generate a snapshot of the data stored in the block volume system 122. In some cases, the snapshot may describe the instant state of user data stored in the block volume system 122 at a particular logical time, as described in more detail below. In contrast to a backup replication approach, the asynchronous replication 140 may include a delta generation 144 sub-system, by which the changes made to the data in the block volume system 122 subsequent to a snapshot may be ascertained. The changes may in turn be represented as deltas, which can be used to update the snapshot, rather than replacing the snapshot entirely. The snapshot generation 142 may generate new snapshots periodically, for example on the order of minutes (e.g., in a range of 1-10 minutes, 10-20 minutes, 20-30 minutes, etc.) and/or on the order of hours (e.g., 1-10 hours).

In some embodiments, the snapshot generation 142 may proceed via a two-phase commit protocol involving the one or more partitions of the block volume system 122. Two-phase commit may include generating a partition image after the snapshot generation 142 has received a commitment from the block volume system that input-output operations on the partition have been suspended. After the partition image is complete, the partition may be released to resume input-output operations. In some embodiments, two-phase commit may be applied to the block volume system 122 as a whole, such that all read and write operations for the entire block volume system may be blocked during the time that the snapshot is being generated. In some embodiments, a snapshot may be generated on the order milliseconds (e.g., 1-15 msec, 5-10 msec, etc.).

In some embodiments, snapshot generation 142 includes generating an image of the data stored in the block volume system 122 on a partition-wise basis. Where the block volume system 122 stores the data in one or more partitions, the snapshot generation 142 may schedule generation of a partition image such that it does not interfere with input-output operations of a partition. The snapshot generation 142 may generate and compile images of every partition included in the block volume system, while potentially avoiding interruption of normal input-output operations of the partitions other than the partition being imaged.

A snapshot may record the image of the data at a particular logical time, where logical time refers to an implementation of the snapshot generation 142. For example, a first snapshot generated by the snapshot generation 142 may be identified with a first logical time, and may be generated during a length of chronological time over which the one or more partitions of the block volume system 122 are processed by the snapshot generation 142. Similarly, the snapshot generation 142 may generate a second snapshot of the block volume system 122 after a period of chronological time has elapsed (e.g., 1-10 minutes, etc.) that may be identified with a second logical time, corresponding to the second iteration of the snapshot generation 142 subsystem.

In some embodiments, the delta generation 144 may facilitate the asynchronous replication 140, at least in part by permitting the asynchronous replication 140 to transfer new or modified data to the second data center 130, without also sending unchanged data. In some cases, a delta may describe changes in data stored in the a partition of the block volume system 122 between a first snapshot and a second snapshot. For example, the delta generation 144 may compare the second snapshot to the first snapshot, and may ascertain which blocks have been added, removed, modified, or the like. In this way, the deltas may also describe data that has been removed between the two consecutive snapshots.

In some cases, a delta may be a logical structure including a unique identifier, as well as a list of memory pointers. The memory pointer may describe the memory locations in the first data center 120 and/or second data center 130 for the data that has changed between the two consecutive snapshots. As described in more detail in reference to FIGS. 2-6, below, implementing the asynchronous replication 140 may include transferring a delta for a partition to the second data center 130, rather than transferring an entire snapshot.

In some embodiments, the data store 132 at the second data center 130 may store replicated data as object storage. As such, the asynchronous replication 140 may include a data conversion 146 sub-system to convert data from the first data center 120 into chunk objects. In some embodiments, data from the block volume system 122 may be incorporated into 4 MB chunk objects. In some embodiments, the chunk objects may implement a format similar to that used for system backup operations, which may permit the asynchronous replication 140 to integrate into existing distributed storage systems employing backup and or tiered-upload techniques.

In some embodiments, the asynchronous replication 140 may generate a checkpoint after deltas corresponding to the partitions of the block volume system 122 have been generated. In some embodiments, a checkpoint generation 148 sub-system may generate the checkpoint by aggregating the deltas and applying the aggregated changes to a previously generated checkpoint, as described in more detail in reference to FIG. 4, below.

When the first data center experiences a failure (e.g., a catastrophic failure) and a restoration of the system is desired, for example, by a user and/or customer of the block volume system 122, a failover/failback request 150 may be provided to the asynchronous replication 140. The failover/failback request 150 may be a form of a restore request that causes the asynchronous replication 140 to generate a restore volume using replicated data stored in the second geographical region. In some embodiments, the asynchronous replication 140 may implement one or more restore operations in response to receiving a failover/failback request 150. In some embodiments, the failover/failback request 150 may include a request by an external service of a distributed storage system and/or a request by a user of the distributed storage system. In some cases, as when the data store 132 is a replica of the block volume system 122 (e.g., a standby volume), a failover request may indicate that the data store 132 should be configured to assume the role the block volume system 122. For example, the data store may handle input-output operations involving the user data. In some embodiments, the failover/failback request 150 may indicate that the first data center 120 should be configured to receive replicated data, as described above, and resume operations that preceded the failure that led to the failover request (e.g., a failback restore).

Figure 2:
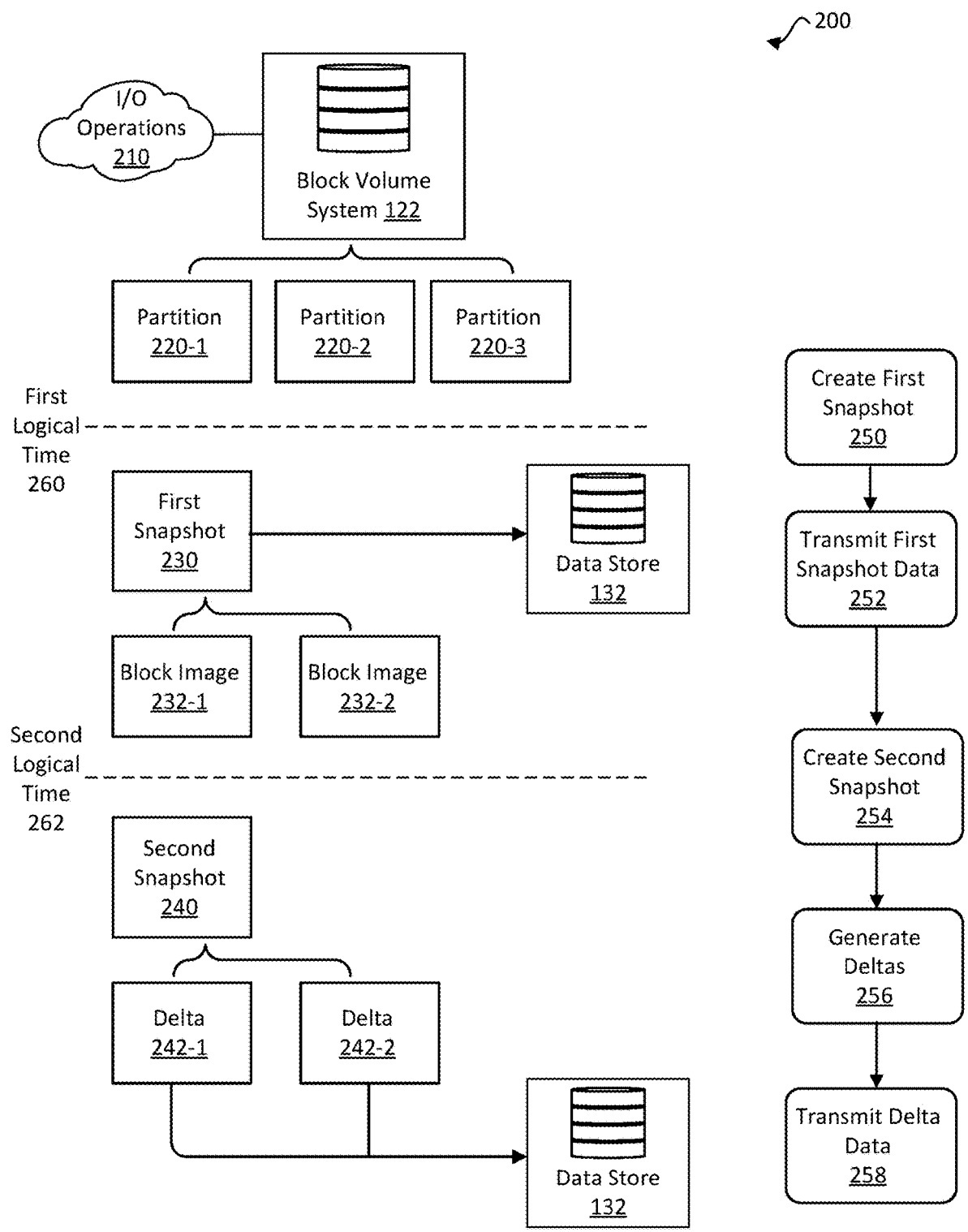
FIG. 2 illustrates an example technique for asynchronous block volume replication, in accordance with one or more embodiments.

FIG. 2 illustrates an example technique 200 for asynchronous block volume replication, in accordance with one or more embodiments. As described above, asynchronous replication may permit user data to be transferred from a source system to a destination system in incremental units, rather than as a single backup image. In some embodiments, the block volume system 122 may store user data that can be received from the user and provided to the user via input-output (I/O) operations 210. Data thus received may be stored in one or more constituent partitions 220 of the block volume system 122. Asynchronous replication systems (e.g., asynchronous replication 140 of FIG. 1) may replicate and transfer user data from the block volume system 122 to the data store 132 by one or more processes as described below.

In some embodiments, user data may be replicated by creating a first snapshot 230 (e.g., operation 250). As described in more detail in reference to FIG. 1, a snapshot may be a record of the data stored in the block volume system 122. Snapshot generation (e.g., snapshot generation 142 of FIG. 1) of the first snapshot 130 may occur at a first logical time 260. A logical time, as described in more detail in reference to FIG. 1, may describe an iteration of the snapshot generation operation (e.g., operation 250), for example, when snapshot generation proceeds on a partition-wise basis, implementing two-phase commit protocols with each of the constituent partitions 220 of the block volume system 122. In such cases, the first logical time 260 may correspond to a period of time during which the snapshot is being created.

In some cases, the first snapshot 230 is the very first implementation of asynchronous replication of user data stored in the block volume system 122. In such cases, the entire data set represented by the first snapshot 230 may be transferred to the data store 132. In this way, the first snapshot 130 may be similar to a backup, at least in that an entire record of user data and metadata (e.g. a manifest, as described below), may be transferred from the source system to the destination system (e.g., operation 252).

In some embodiments, the first snapshot may be a disk image of the block volume system 122 and/or the constituent partitions 220. In some embodiments, the first snapshot 230 may include multiple block images 232, such that the data described by the first snapshot 230 may be transferred asynchronously to the data store 132 at least in part by transferring the block images 232 individually and/or in groups. As described in more detail in reference to FIG. 3, the block images 232 may be converted to chunk objects to be stored in the data store 132, for example, when the data store 132 is an object storage system.

In some embodiments, asynchronous replication may include creating a second snapshot 240 (e.g., operation 254) at a second logical time 262. In some embodiments, the second logical time 262 corresponds to a period of time following the first logical time 260, as described in more detail in reference to FIG. 1, above. For example, the second snapshot 240 may be created by the two-phase commit protocol described above several minutes after the creation of the first snapshot 230 (e.g., 1-15 min, 5-10 min, etc.). In some embodiments, the second snapshot 240 may include one or more changes to the data stored in the block volume system 122 relative to the first snapshot 230.

Rather than transfer the second snapshot 240 directly, the technique 200 may include generating deltas 242 corresponding to the constituent partitions of the block volume system 122 (e.g., operation 256). As described in more detail in reference to FIG. 1, above, delta generation (e.g., delta generation 144 of FIG. 1) may include comparing the state of data reflected in the first snapshot 230 to that of the second snapshot 240 to generate a list of modified blocks (identified by pointers) paired to reference chunk identifiers of the destination system (e.g., the data store 132), which may make up at least part of the data included in the deltas 242 for each partition 220. In some embodiments, the deltas may also include a unique delta identifier. In some embodiments, the unique delta identifier may correspond to an identifier of the second snapshot 240. In this way, the deltas 242 may reflect changes to the data that can be traced to the second logical time 262, for example, as an approach to providing I/O history.

Once generated, the deltas 242 may be transferred to the destination system, for example, the data store 132 (e.g., operation 258). In some embodiments, the deltas 242 may be transferred with any new data added to the block volume system 122. Data that is removed from the block volume system 122 between the first logical time 260 and the second logical time 262 may be reflected by metadata included in a delta 242, without transferring any data (e.g., chunk objects) from the source system to the destination system.

Figure 3:
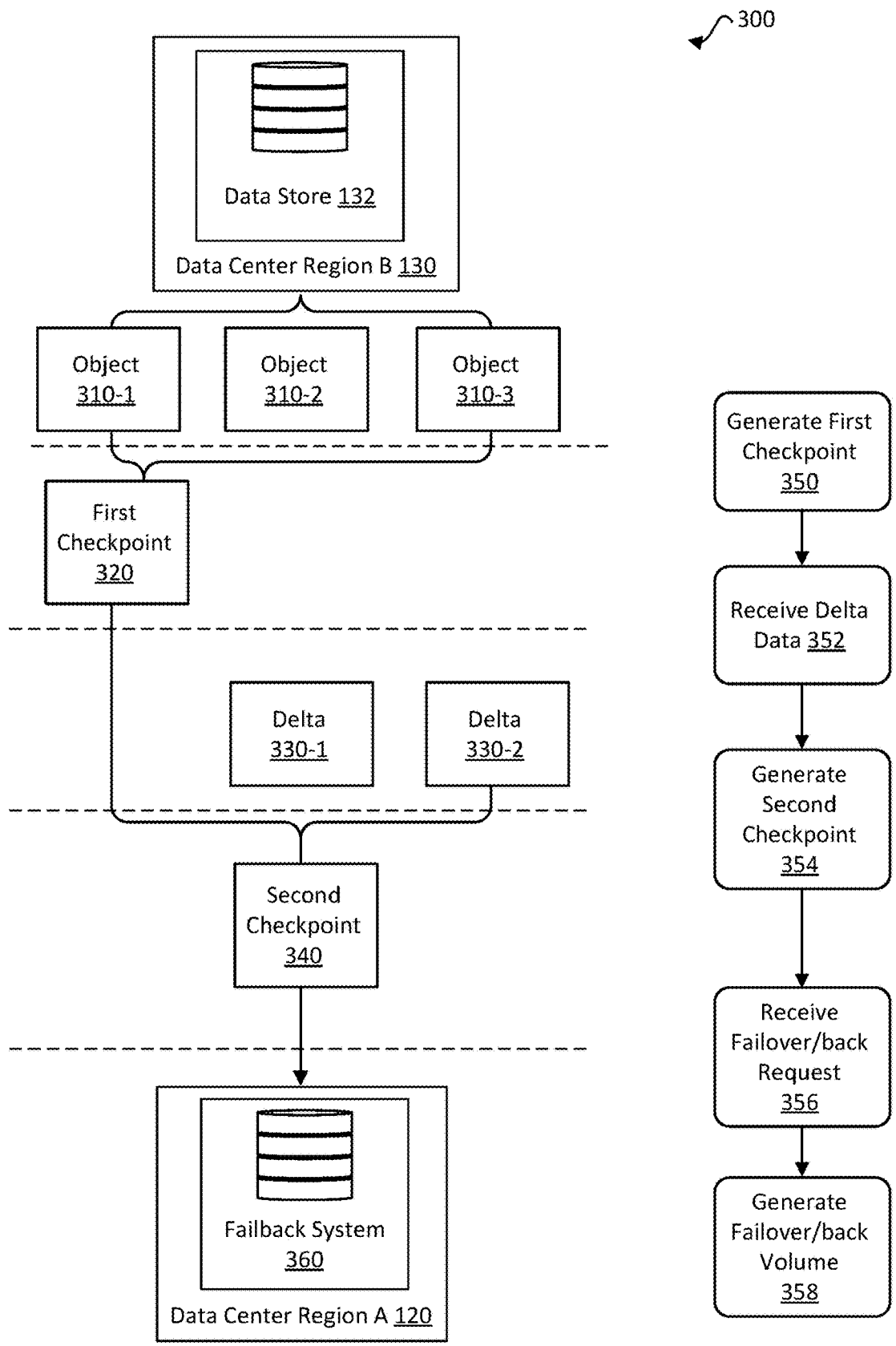
FIG. 3 illustrates an example technique for restoring a block volume system by asynchronous replication, in accordance with one or more embodiments.

FIG. 3 illustrates an example technique 300 for restoring a block volume system by asynchronous replication, in accordance with one or more embodiments. As part of the asynchronous replication system described in reference to FIGS. 1-2, above, the destination system, for example, the second data center 130, may receive and maintain a replica of the data stored in the source system (e.g., first data center 120 of FIG. 1). In some embodiments, the second data center 130 may be located in a geographic region that is different from that of the source system (e.g., Region B as opposed to Region A). The second data center 130 may include the data store 132 that may store replicated data in object storage, as one or more data objects 310.

In some embodiments, the data store 132 may operate as an object storage system based at least in part on a configuration of the asynchronous replication system, such that the asynchronous replication may be configured to store replicated data as chunk objects, rather than as blocks. That being said, in some embodiments, the second data center 130 may include a standby volume, permitting direct application of deltas to the standby volume. In embodiments where the data store 132 includes a standby volume, asynchronous replication may be completed without converting blocks to objects (e.g., data conversion 146).

In some embodiments, asynchronous replication may include generating a first checkpoint 320 (e.g., operation 350). A checkpoint may differ from a snapshot, at least in that it may include a manifest (e.g., metadata) describing the locations and identifiers of the chunk objects stored in the data store 132, as described in more detail in reference to FIG. 4. For example, where the first checkpoint 320 corresponds to the first time a checkpoint has been generated as part of asynchronous replication, the first checkpoint may include a list of chunk pointers for each of the chunk objects making up the replicated data.

As part of asynchronous replication, the second data center 130 will receive deltas 330 and corresponding data from the source system (e.g., operation 352). As described above, the deltas may include metadata describing the changes to the data stored in the source system resulting from input-output operations (I/O operations 210 of FIG. 2) between a first snapshot and a second snapshot. The corresponding data may be received as chunk objects (e.g., 4 MB chunk objects).

The deltas 330 may be applied to the first checkpoint 320 as part of generating the second checkpoint 340 (e.g., operation 354). Generating the second checkpoint may include identifying one or more chunk objects identified in the deltas 330, and applying an indicated modification indicated by the deltas. For example, one or more transformations to chunk data may be indicated by a first delta 330-1 of the deltas 330, where the first delta 330-1 indicates (e.g., via a chunk pointer) the location in object storage of the data store 132 of the referenced data for a given partition. In some embodiments, rather than modify the referenced data directly, asynchronous replication may include updating the first checkpoint 320 to reflect the changes indicated by the first delta 330-1, as part of generating the second checkpoint 340 as described in more detail in reference to FIG. 4, below.

In some embodiments, the second data center 130 (e.g., the destination system) may be the subject of a failover/failback request (e.g., failover/failback request 150 of FIG. 1), which may be received from a user of the asynchronous replication system (e.g., asynchronous replication system 140 of FIG. 1, via operation 356). The failover/failback request may be in response to a failure (e.g., a natural disaster) impacting the source system (e.g., first data center 120 of FIG. 1). The failover/failback request may include parameters guiding how the block volume system is to be restored from the replicated data and the second checkpoint, as described in more detail in reference to FIGS. 7-10, below.

Implementing a failover/failback request may include generating a failover/failback volume, also referred to as a restore volume (e.g., operation 358). As described above, a failover system may be hosted at the destination system, while a failback system may be hosted at the source system. In some embodiments, as when a failback request is received, the second checkpoint 340 may be used to map data stored in the objects 310 to blocks in the source system (e.g., block volume system 122). The process of generating a failback volume is described in more detail in reference to FIG. 5, below. Similarly, failover may include generating a block volume system at the second data center 130 to assume the role of the first data center 120 with regard to input-output operations, for example, until the first data 120 center has recovered from the failure. Generating a failover volume at the second data center 130 may include mapping data stored in the objects 310 to blocks, for example, by using the second checkpoint 340, as described in more detail in reference to FIG. 4, below. In some embodiments, restoring block volume data may include one or more operations including, but not limited to, creating a new block volume in the destination region, implementing a failover in the destination region, enabling cross-region replication onto a new volume in the source region, and performing a failover in the source region.

In some embodiments, as when the second data center 130 maintains a standby volume to store the replicated data, the standby volume may already include all of the changes from the source volume except for the changes from any deltas that had not been transferred from the source system at the time of the failure. As such, failover may be available immediately (e.g., indicating a low RTO) with relatively little lost data (e.g., an RPO on the order of the snapshot generation time of 1-15 minutes), as described in more detail in reference to FIG. 5, below. By contrast, a backup system implementing synchronous replication of entire backup images may result in an RPO on the order of several hours.

In some embodiments, rather than generating a failover/failback volume, asynchronous replication may include reverse replication. In such cases, the destination system may be designated as the source system, while the previous source system may be re-designated as the destination system. In this way, input-output operations may occur at the second data center 130, with data being written and read at the data store 132, and with snapshot creation and delta generation occurring there, as well. Correspondingly, replicated data may be transferred to the first data center 120.

Figure 4:
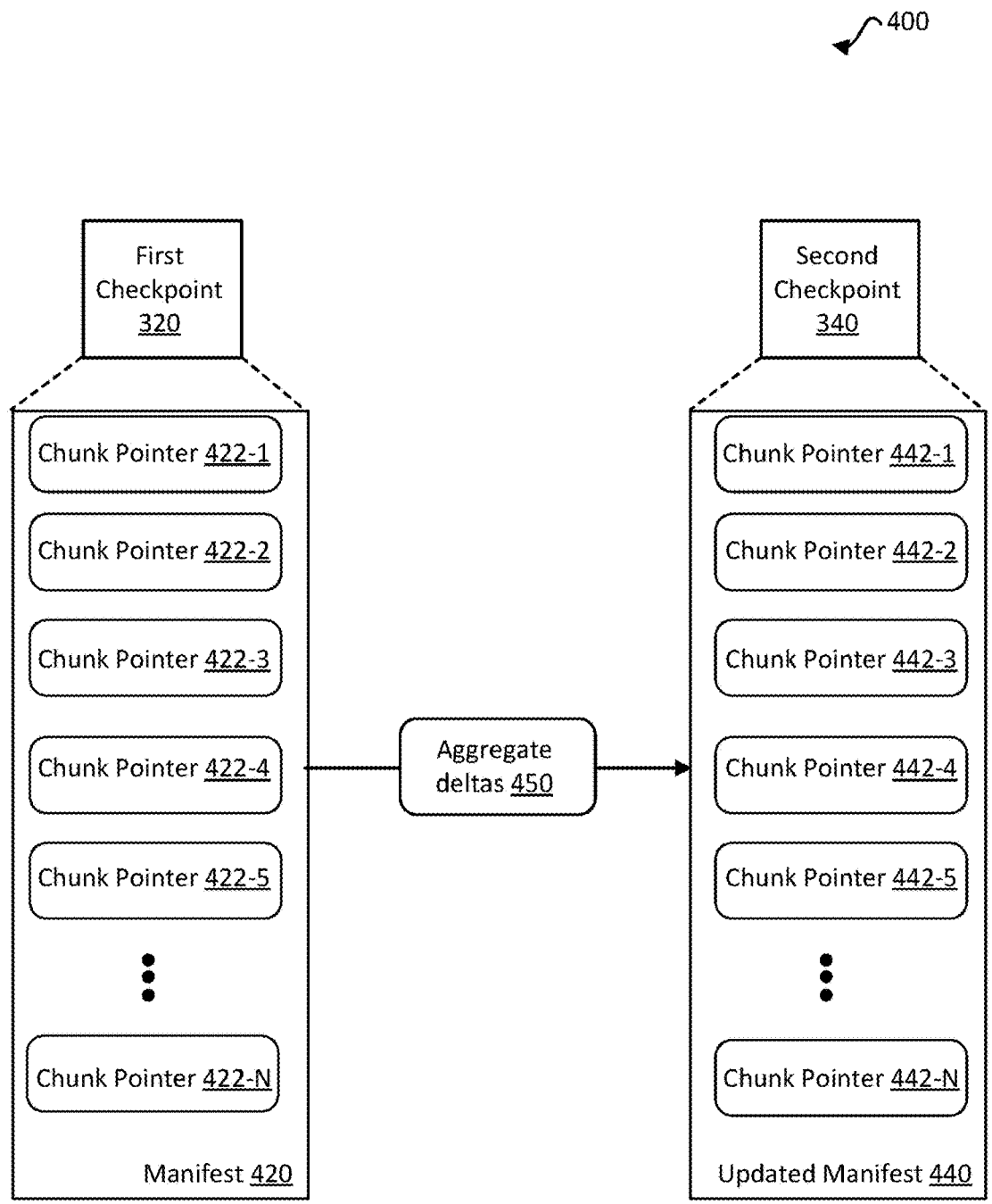
FIG. 4 illustrates an example technique for aggregating block volume replication metadata, in accordance with one or more embodiments.

FIG. 4 illustrates an example technique 400 for aggregating block volume replication metadata, in accordance with one or more embodiments. The asynchronous replication may include multiple iterations of one or more constituent operations (e.g., snapshot creation, delta generation, etc.) over a period of time for which data may be replicated. In such cases, updating the destination system (e.g., second data center 130 of FIGS. 1-3) may include maintaining an updated record of memory locations corresponding to the replicated data, reflecting changes introduced by each subsequent iteration.

In some embodiments, asynchronous replication may include generating the second checkpoint 340, via one or more operations on the deltas (e.g., deltas 330 of FIG. 3) and the first checkpoint 320. For example, when multiple deltas are received at the destination system from the source system following generation of the first checkpoint 320, an accurate record of memory locations may be better represented by the changes indicated by the deltas, as applied to the first checkpoint 320, rather than in reference the first checkpoint alone.

In some embodiments, the first checkpoint 320 may include a manifest 420. The manifest 420 may correspond to a partition of the source system (e.g., to guide failover/failback operations), and, as such, multiple manifests may describe the asynchronous replication of the data from the source system when the source system includes multiple partitions. The manifest 420 may include a list of chunk pointers 422 (e.g., chunk pointers 1-N, where "N" is an integer that references the number of chunk pointers 422 included in the manifest 420). The chunk pointers 422 may describe memory locations associated with the replicated data (e.g., stored as chunk objects in the data store 132). Subsequent to generating the first checkpoint 320, the destination system may receive multiple deltas, for example, as generated by an iteration of snapshot creation and delta generation. In this way, generating the second checkpoint 340 may include aggregating the deltas (e.g., operation 450). For example, aggregating the deltas may include referencing an identifier of the first checkpoint 320 to ascertain the snapshot from which the deltas were generated. In this way, the checkpoint reference may permit the determination of whether the received deltas (also including an identifier that references a snapshot) are already reflected in the manifest 420.

In some embodiments, deltas may be combined with the first checkpoint to provide an updated manifest 440. Combining the deltas may include modifying a first chunk pointer 422-1 in the manifest as indicated by a delta (e.g., a pointer to the location of the data may change in response to a transformation on the replicated data that is described by a delta). In this way, by applying all the transformations indicated in all the received deltas to the manifest, the updated manifest 440 may permit a failover/failback volume to be generated with a potentially reduced RPO than if the earlier manifest (e.g., manifest 420) were to be used. Similarly, for each iteration of asynchronous replication, newly generated deltas may be generated and transferred to the destination system, where they may be aggregated with the most recent manifest (e.g., updated manifest).

Figure 5:
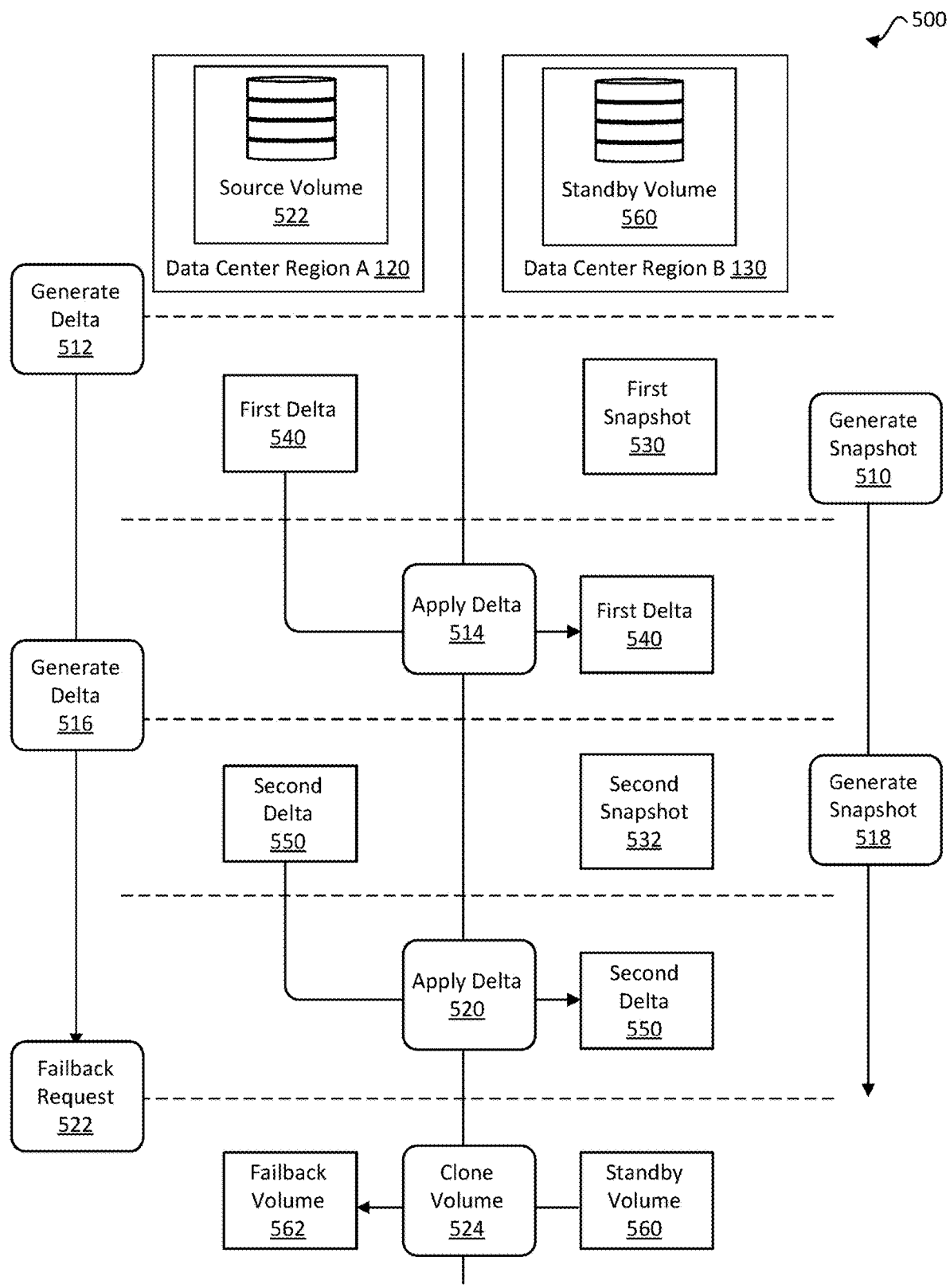
FIG. 5 illustrates an example technique for generating a failover volume from a standby volume, in accordance with one or more embodiments.

FIG. 5 illustrates an example technique 500 for generating a failback volume from a standby volume, in accordance with one or more embodiments. As described above, failback requests (e.g., failover/failback request 150 of FIG. 1) may be received as part of failure recovery at the source system, for example, the first data center 120. A failback volume, as opposed to a failover volume hosted at the destination system or reversed replication, may be preferred for the same reasons that led to the first data center 120 being selected to host user data (e.g., performance metrics, stability, etc.).

In some embodiments, the destination system, for example, the second data center 130, may implement a standby volume 560 to replicate data at a source volume 522. The standby volume 560 may include all the deltas received from the source volume, such that the standby volume reflects the current state of the source volume 522. For example, a first delta 540 may be generated from the source volume 522 (e.g., by operation 512), and the first delta 540 may be applied directly to the standby volume 560 (e.g., by operation 514). In some embodiments, applying a delta to the standby volume 560 may include copying referenced data (e.g., modified blocks) from the source volume and replicating the referenced data in the standby volume in a manner similar to an input-output operation (e.g., a user-write operation). Furthermore, applying the delta may include updating a manifest as described in reference to FIG. 4. While FIG. 4 described a manifest with regard to chunk pointers, a manifest may similarly describe memory locations in the standby volume where replicated data may be stored.

In some embodiments, updating the standby volume 560 may include applying deltas in discrete operations, such that a delta may not be partially applied to the standby volume 560. For example, a first snapshot 530 of the standby volume 560 may be generated to provide a fallback position in case a failover/failback request is received during the operation of applying the delta (e.g., operation 514). In this way, rather than waiting for the delta to be applied, the system recovery may implement the first snapshot 530, which may provide improved RTO, at the cost of an incremental increase to RPO. In some embodiments, the first snapshot 530 may be deleted once the first delta 540 is applied to the standby volume 560. In turn, when a second delta 550 (or deltas) is generated (e.g., operation 516), a second snapshot 532 may be generated (e.g., operation 518) at the standby volume 560 prior to applying the second delta (e.g., operation 520). After applying the second delta completely, the second snapshot 550 may be deleted as well.

In some embodiments, the standby volume 560 may be used to generate a failover volume or a failback volume in response to receiving a failover/failback request (e.g., operation 522). In some embodiments, data restoration may include transferring data back to the source region by enabling cross region replication on a failover volume. In some embodiments, when the request is a failback request, the standby volume 560 may be cloned and restored at the first data center 120 (e.g., operation 524). Cloning the standby volume 560 may include creating a failback volume 562 at the first data center 120 and restoring the data (e.g., sometimes also referred to as "hydrating the clone"). In some embodiments, the restored data may include the modifications indicated by the second delta 550, if the second delta has been completely applied at the time that the failback request is implemented. Implementing a failover restoration using cloning may potentially permit cross region replication to continue on the existing standby volume. Advantageously, clone volumes may be available with little to no latency, permitting a negligible effect on RTO.

Figure 6:
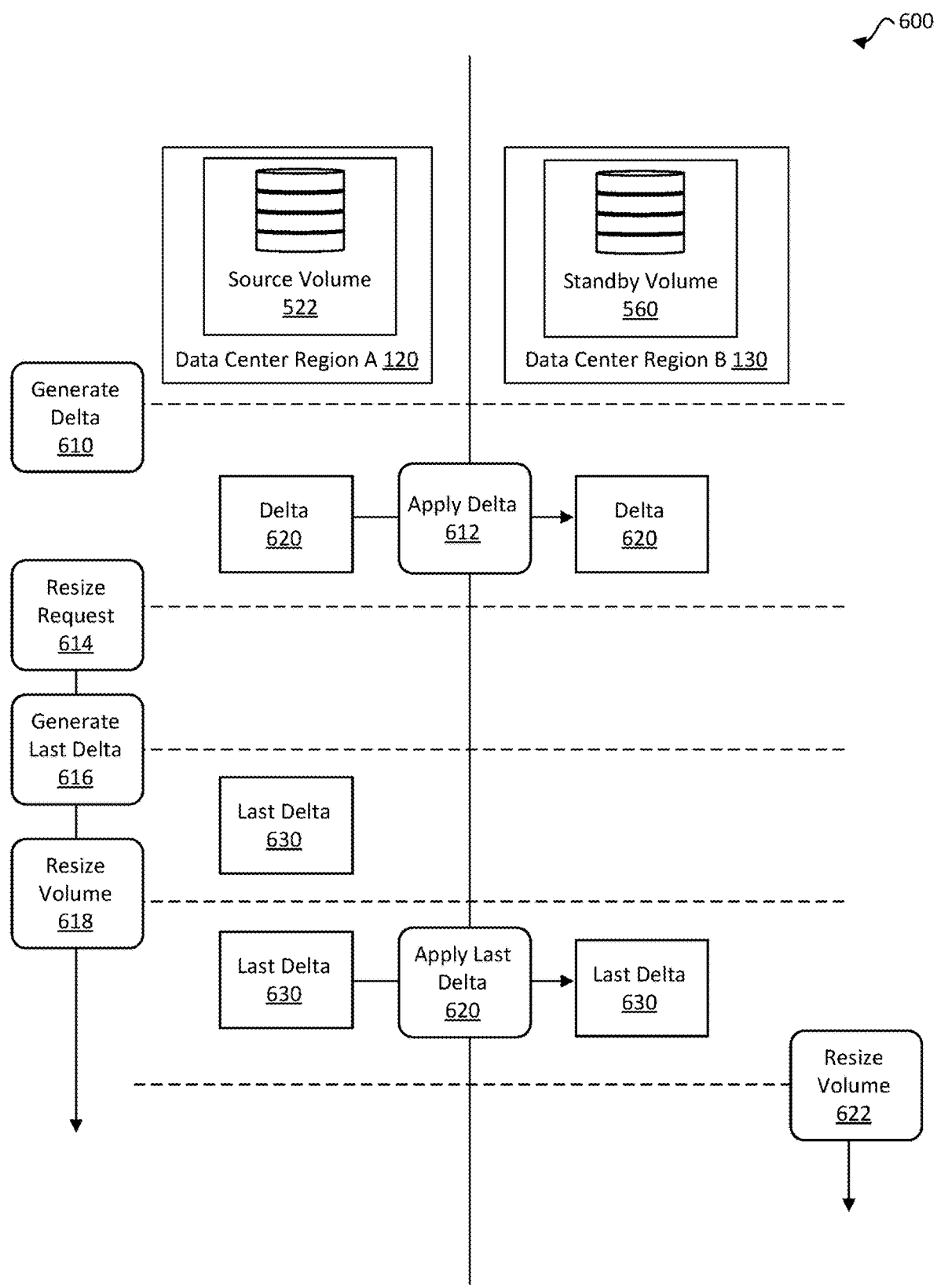
FIG. 6 illustrates an example technique for resizing a standby volume, in accordance with one or more embodiments.

FIG. 6 illustrates an example technique 600 for resizing a standby volume, in accordance with one or more embodiments. Normal operation of a source system, such as source volume 522 at the first data center 120, may include resizing the source volume 522 (e.g., to add partitions, remove partitions, resize one or more partitions of the source volume 522, etc.). In some embodiments, since deltas are generated for a partition, resizing the source volume 522 may affect the mapping of the source volume deltas 522 to the standby volume 560. As such, the standby volume 560 may be resized to account for the resizing the source volume 522, after implementing one or more approaches to limit potential errors in delta application introduced by resizing the source volume 522.

In some embodiments, one or more deltas 620 may be generated from the source volume 522 as described in more detail in reference to FIGS. 1-2, above (e.g., operation 610). The delta 620 may be applied to the standby volume 560 as described in reference to FIG. 5, above (e.g., operation 612). In some cases, resizing the source volume 522 may include receiving a resize request from a user or from another system (e.g., operation 614). To potentially limit the impact of resizing on RPO, a last delta 630 may be generated after receiving the resize request, prior to resizing the source volume 522 (e.g., operation 616). In some embodiments, generating the last delta 630 may include creating a new snapshot of the source volume 522, generating deltas based at least in part on the new snapshot, and applying the deltas thus generated. In this way, the standby volume 560 may describe the state of the source volume immediately preceding implementation of the resize request by resizing the source volume 522 (e.g., operation 618). Applying the last delta (e.g., operation 620) may be decoupled from resizing the source volume 522, such that once the last delta 630 is generated, the source volume may be resized before the last delta may be applied to the standby volume 560. In some embodiments, the standby volume 560 may be resized in a corresponding manner (e.g., operation 622) following application of the last delta.

Figure 7:
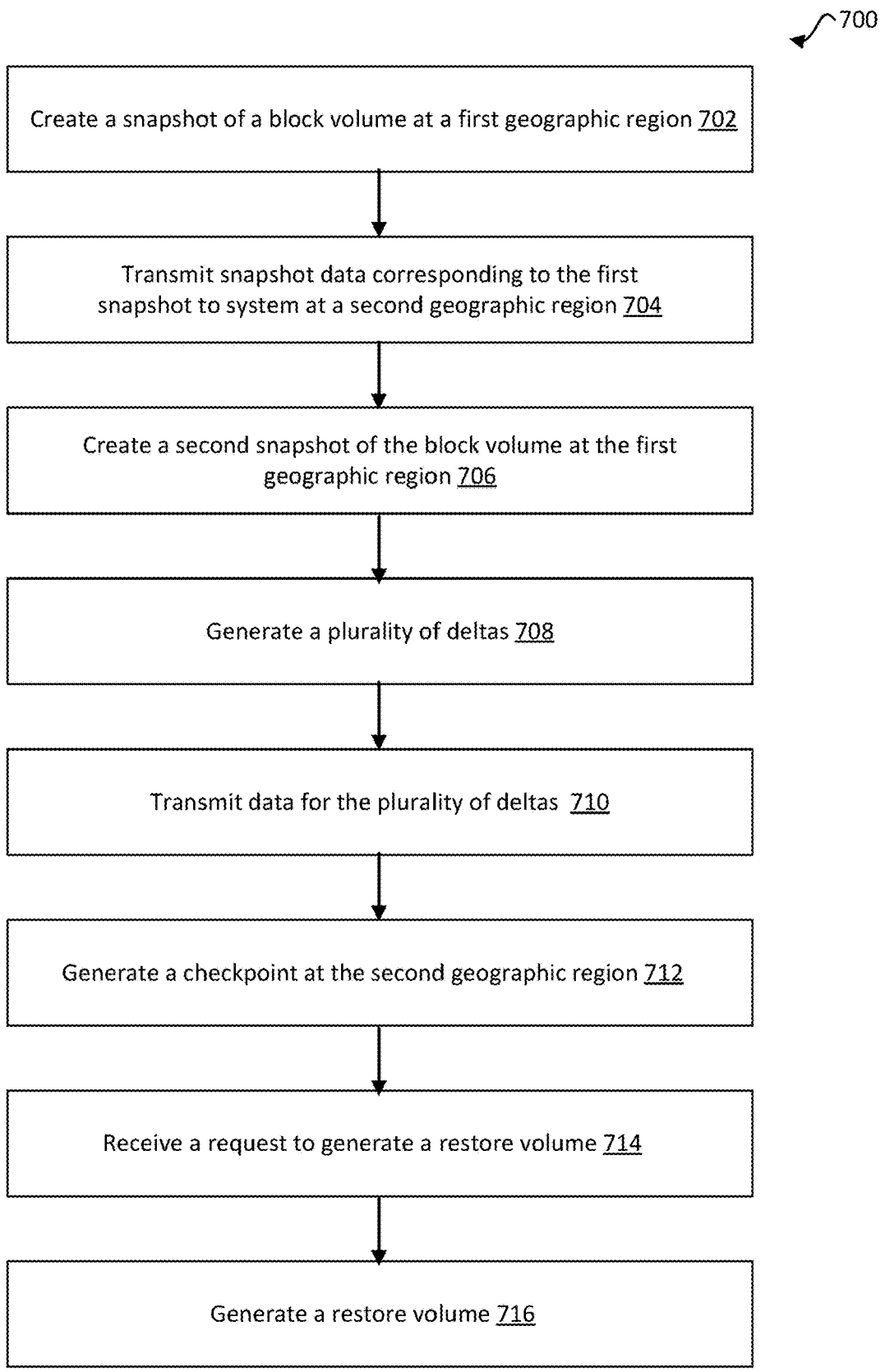
FIG. 7 illustrates an example flow for generating a restore volume, in accordance with one or more embodiments.

FIG. 7 illustrates an example flow 700 for generating a restore volume, in accordance with one or more embodiments. The operations of the flow 700 can be implemented as hardware circuitry and/or stored as computer-readable instructions on a non-transitory computer-readable medium of a computer system, such as the asynchronous replication system 140 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 700 includes an operation 702, where the computer system creates a snapshot of a block volume at a first geographic region. As described in more detail in reference to FIGS. 1-2, the block volume (e.g., block volume system 122 of FIG. 1) may be hosted at a first data center (e.g., first data center 120 of FIG. 1) in a first geographic region, which may be determined based at least in part on one or more performance metrics associated with input/output operations, stability, cost, etc. creating the first snapshot (e.g., operation 250 of FIG. 2) may include generating one or more block images (e.g., block images 232 of FIG. 2) of the one or more blocks making up the block volume. Creating a snapshot may include implementing a two-phase commit protocol whereby input-output operations (e.g., I/O operations 210 of FIG. 2) may be suspended for a partition of the block volume, during which time the block images for that partition are created. Following creation of the snapshot for the partition or for the block volume system, the computer system may resume input-output operations on the block volume.

In an example, the flow 700 includes an operation 704, where the computer system transmits snapshot data corresponding to the first snapshot to a second storage system at a second geographic region. In some embodiments, as when the first snapshot is the very first snapshot created of the block volume or if a prior-created snapshot is not available, the snapshot data may include the block images. As such, the block images may be transmitted to the system (e.g., data store 132 of FIG. 1). In some embodiments, the block images may be converted into chunk objects and transmitted as snapshot data to the second storage system (e.g., operation 252 of FIG. 2). In some cases, the chunk objects are transmitted along with metadata describing the snapshot data including, for example, a manifest listing chunk pointers identifying the locations of snapshot data in memory.

In an example, the flow 700 includes an operation 706, where the computer system creates a second snapshot of the block volume at the first geographic region. As described in more detail in reference to FIG. 2, the second snapshot (e.g., second snapshot 240 of FIG. 2) may describe the state of the block volume at a second logical time (e.g., second logical time 262 of FIG. 2) following a first logical time (e.g., first logical time 260 of FIG. 2) at which the first snapshot was created. The second snapshot may include information about modifications to data stored in the block volume system that occurred (e.g., read-write operations on the data) subsequent to the creation of the first snapshot.

In an example, the flow 700 includes an operation 708, where the computer system generates a plurality of deltas. Rather than transmit the second snapshot directly to the second storage system, the plurality of deltas may describe one or more changes to data stored in the block volume between the creation of the second snapshot (e.g., second logical time) and the first snapshot (e.g., first logical time). Generating the deltas may include comparing block images of a partition in the second snapshot to the corresponding images of the partition in the first snapshot, and identifying one or more modifications to the data in the partition. As described in more detail in reference to FIGS. 1-2, the deltas may include metadata including, but not limited to, a delta identifier corresponding to the snapshot, one or more block identifiers describing data in the block volume that were modified, and/or a corresponding number of object identifiers describing the locations of the data identified by the block identifiers.

In an example, the flow 700 includes an operation 710, where the computer system transmits data for the plurality of deltas. As described in more detail in reference to FIG. 2, transmitting the data may include creating a replica of data from the block volume system to the second storage system. This may include generating chunk objects and copying the chunk objects to the second storage system (e.g, the destination system), as when the replicated data is stored in object storage. The data may be accompanied by the plurality of deltas, which may provide metadata describing the correspondence between chunk objects and blocks of the block volume system on a partition-wise basis.

In an example, the flow 700 includes an operation 712, where the computer system generates a checkpoint at the second geographic region. As described in more detail in reference to FIGS. 3-4, a checkpoint (e.g., first checkpoint 320 of FIG. 3) may include a manifest (e.g., manifest 420 of FIG. 4) describing a plurality of chunk pointers. In some embodiments, generating the checkpoint may include aggregating the deltas (e.g., operation 450 of FIG. 4) with a prior-generated checkpoint to generate an updated checkpoint (e.g., second checkpoint 340 of FIG. 3), that may include an updated manifest (e.g., updated manifest 420 of FIG. 4) describing a second plurality of chunk pointers reflecting the modifications included in the plurality of deltas as applied to the checkpoint.

In an example, the flow 700 includes an operation 714, where the computer system receives a restore request. The restore request (e.g., failover/failback request 150 of FIG. 1) may include a user request to generate a restore volume at the second geographic location, also referred to as a failover volume. In some embodiments, the restore request may include a user request to generate a restore volume at the first geographic location, also referred to as a failback volume. In some embodiments, the restore request may include a request to reverse the asynchronous replication, thereby designating the second storage system (e.g., data store 132 of FIG. 1) as the source system and the block volume system (e.g., block volume system 122 of FIG. 1) as the destination system for asynchronous replication. In some embodiments, the restore request may be generated automatically (e.g., without user interaction) as part of a configuration of the asynchronous replication. For example, the asynchronous replication system may be configured to automatically generate a restore request in response to a failure occurring at the source system.

In an example, the flow 700 includes an operation 716, where the computer system generates the restore volume. Generating the restore volume, as described in reference to FIG. 3 and FIG. 5, may include generating a block volume, for example, by mapping replica data from chunk objects stored in object storage to blocks in the block volume in reference to the updated manifest (e.g., updated manifest 440 of FIG. 4). In this way, the restore volume may be generated with a lower RPO than could be achieved by a backup system. Similarly, the RTO of the system restore operation, which may reflect the time between receiving the restore request and resuming normal input/output operations, may depend on whether the restore request is a failover or a failback request, which is described in more detail in reference to FIG. 8 and FIG. 9, below.

Figure 8:
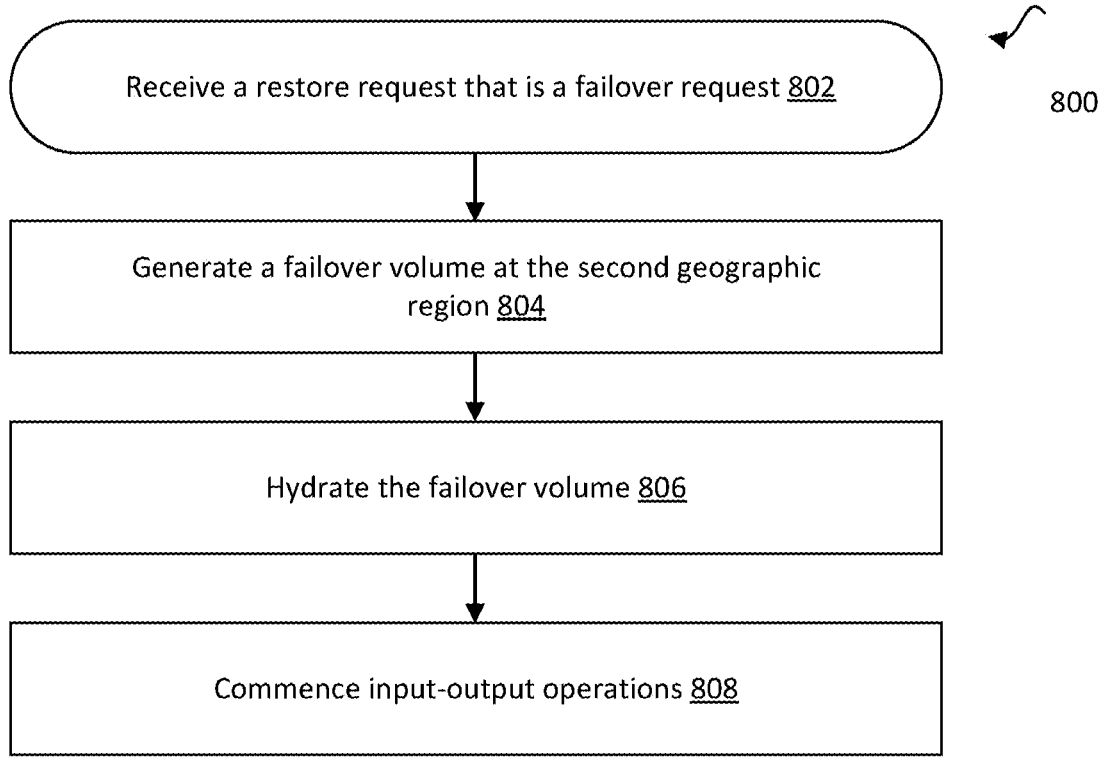
FIG. 8 illustrates an example flow for generating a failover volume, in accordance with one or more embodiments.

FIG. 8 illustrates an example flow 800 for generating a failover volume, in accordance with one or more embodiments. The operations of the flow 800 can be implemented as hardware circuitry and/or stored as computer-readable instructions on a non-transitory computer-readable medium of a computer system, such as the asynchronous replication system 140 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 800 includes an operation 802, where the computer system receives a restore request that is a failover request. As described in more detail in reference to FIGS. 1-6, above, a failover request may be received by the asynchronous replication (e.g., asynchronous replication 140 of FIG. 1) following a disaster or other failure affecting a block volume system (e.g., block volume system 122 of FIG. 1) that may form a part of a distributed storage system (e.g., cloud storage). In some embodiments, the failover request may include a request to generate a failover volume reproducing the block volume system at a second geographic region that is potentially unaffected by the failure impacting the block volume system.

In an example, the flow 800 includes an operation 804, where the computer system generates a failover volume at the second geographic region. A failover volume, in some cases, may permit resumption of input-output operations (e.g., I/O operations 210 of FIG. 2) before the failure affecting the block volume system has been resolved. In such cases, the RTO may be improved by generating a failover volume, as compared to a failback volume. As described in reference to FIG. 7, above, generating the failover volume using replica data stored in object storage may include generating a failover volume in reference to the updated manifest (e.g., updated manifest 440 of FIG. 4) describing the locations in memory of the replica data, being updated with recently aggregated deltas generated during asynchronous replication.

In an example, the flow 800 includes an operation 806, where the computer system hydrates the failover volume. As described in more detail above, hydrating the failover volume may include restoring data described in the updated manifest from object storage (e.g., as in chunk objects described in reference to FIG. 1, above) to blocks that may be addressable by read/write operations (e.g., I/O operations 210 of FIG. 2) of the block volume system. In some embodiments, the partitions of the block volume system may be preserved in the failover volume.

In an example, the flow 800 includes an operation 808, where the computer system commences input-output operations. Following "hydration," where the replicated data from the block volume system has been restored and mapped to the failover volume, the failover volume may begin input-output operations and may assume the role of the block volume system while the failure may be resolved.

Figure 9:
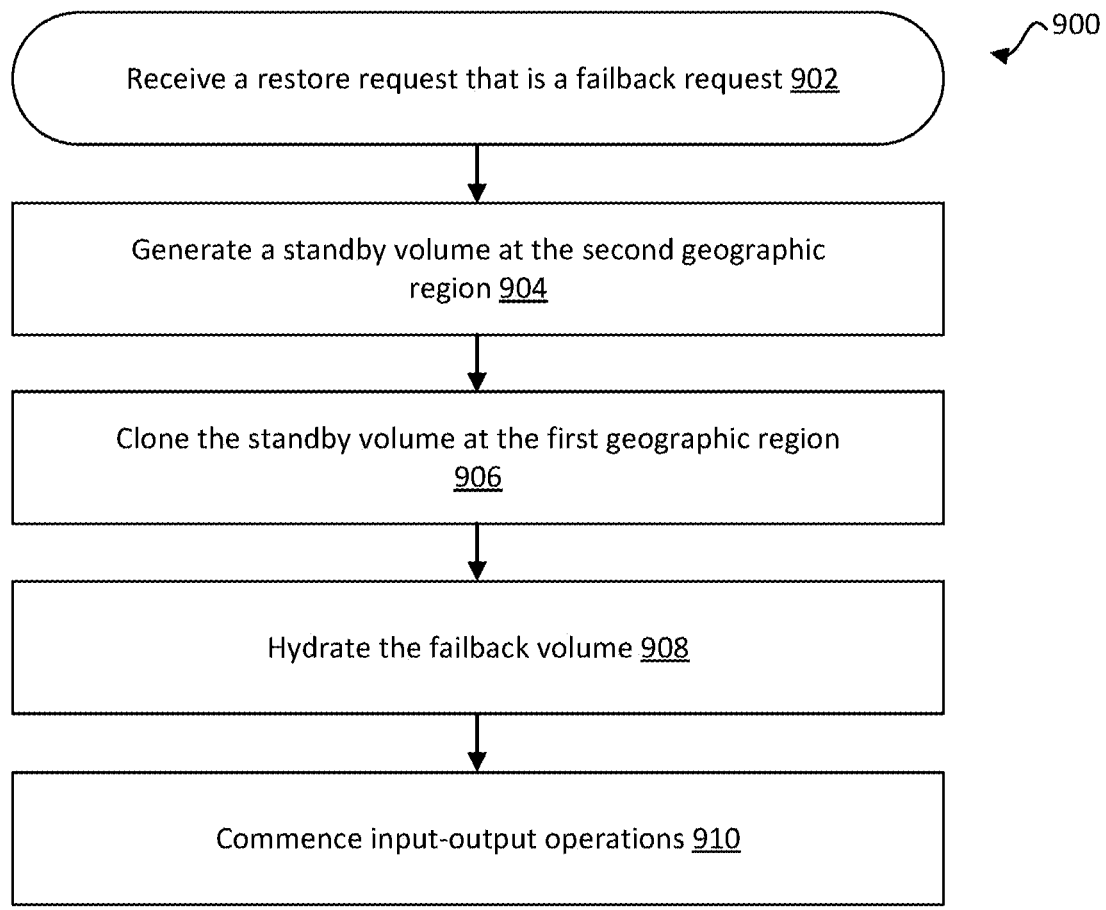
FIG. 9 illustrates an example flow for generating a failback volume, in accordance with one or more embodiments.

FIG. 9 illustrates an example flow 900 for generating a failback volume, in accordance with one or more embodiments. The operations of the flow 900 can be implemented as hardware circuitry and/or stored as computer-readable instructions on a non-transitory computer-readable medium of a computer system, such as the asynchronous replication system 140 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 900 includes an operation 902, where the computer system receives a restore request that is a failback request. In some embodiments, the failure causing the restore request may not be of an indefinite duration. For example, the failure may be resolvable within a predicable length of time, as when the failure is caused by temporary power or network interruptions that can be reliably overcome. As such, a failback request may represent a preferable alternative (e.g., from the perspective of distributed storage performance) to generating a failover volume and a potentially limited difference in terms of RTO relative to a failover volume.

In an example, the flow 900 includes an operation 904, where the computer system generates a standby volume at the second geographic region. In some embodiments, the standby volume may include a block volume system similar to the failover volume, except that it is not designed to execute input-output operations at the second geographic region (e.g., second data center 130 of FIG. 1). For example, the standby volume may be invisible to the user of the distributed storage system and/or may be configured to be ineligible for input-output operations. In some embodiments, the standby volume may reproduce the structure of the block volume system (e.g., in terms of partitioning, size, etc.) and mapping of blocks to the replicated data stored as chunk objects.

In an example, the flow 900 includes an operation 906, where the computer system clones the standby volume at the first geographic region. As described in more detail in reference to FIG. 5, above, cloning the standby volume (e.g., operation 524 of FIG. 5) may include restoring the block volume system to the first geographic region, by generating a failback volume at least in part by using the structure of the standby volume. For example, the standby volume may describe (e.g., in reference to the updated manifest) the structure and mappings of the replicated data, such that the failback volume may be configured to be restored with new mappings once the replicated data is copied from the second geographic region back to the first geographic region.

In an example, the flow 900 includes an operation 908, where the computer system hydrates the failback volume at the first geographic region. In some embodiments, hydrating the failback volume may include restoring the replicated data to the first geographic region (e.g., first data center 120 of FIG. 1) such that the failback volume may resume input-output operations. Restoring the replicated data may include copying the data from the second geographic region to the first geographic region. Restoring the replicated data may also include remapping data from the mappings from asynchronous replication iterations (for example, those generated by delta application) to new mappings corresponding to new data locations in the failback block volume system.

In an example, the flow 900 includes an operation 910, where the computer system commences input-output operations at the first geographic region. Input-output operations describe accessing, storing, and modifying data using the failback volume. As part of system restoration, low RTO and low RPO may improve system performance. For at least this reason, in some embodiments, the input-output operations may commence while data restoration of operation 908 is underway. For example, read-write operations may commence before the replicated data is completely copied over from the second geographic region back to the first geographic region. In some embodiments, the copy-over and remapping may be completed entirely before input-output operations commence on the failback volume.

Figure 10:
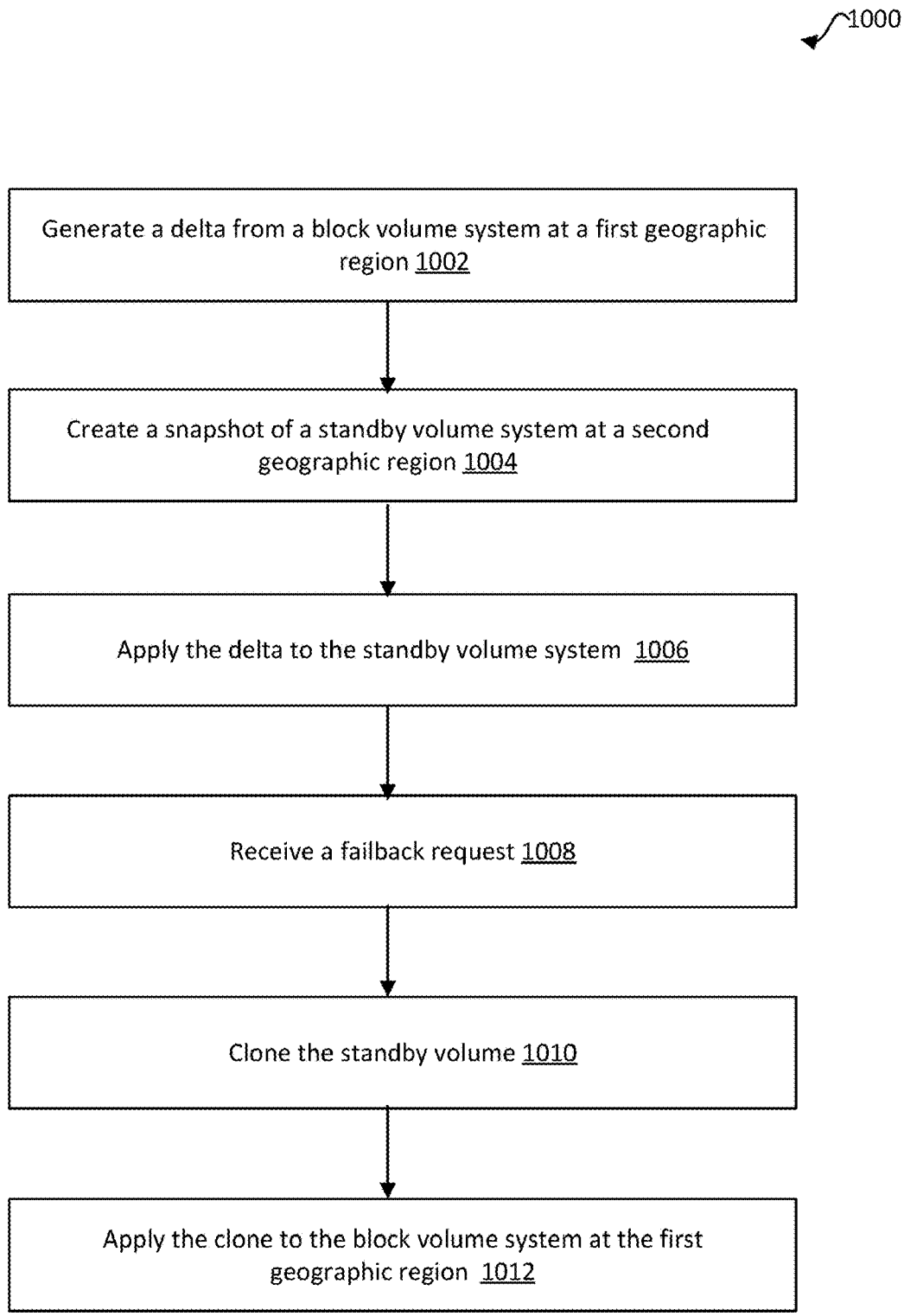
FIG. 10 illustrates an example flow for restoring a block volume system using a standby system, in accordance with one or more embodiments.

FIG. 10 illustrates an example flow 1000 for generating a failback volume, in accordance with one or more embodiments. The operations of the flow 1000 can be implemented as hardware circuitry and/or stored as computer-readable instructions on a non-transitory computer-readable medium of a computer system, such as the asynchronous replication system 140 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

As described in more detail in reference to FIG. 6, in some embodiments, asynchronous replication may include a standby volume at the second geographic location, additionally or alternatively to object storage of replicated data. Rather than converting the data described by the deltas into chunk objects (e.g., as described in reference to data conversion 146 of FIG. 1) the standby volume may include a direct transfer of block data from the block volume system to the standby volume. In some embodiments, standby volumes may be invisible to the user of the block volume system (e.g., not available for input-output operations), but may maintain updated block data to potentially minimize RTO and RPO in the event of a disruption impacting the block volume system. In some embodiments, the standby volume may interact with the object storage in the destination region, for example, by caching the data from deltas while also implementing checkpoint operations on the object storage data.

In an example, the flow 1000 includes an operation 1002, where the computer system generates a delta from a block volume system at a first geographic region. The delta, as described in more detail in reference to FIG. 2, may represent modifications to data stored in the block volume system between a first snapshot at a first logical time and a second snapshot at a second logical time.

In an example, the flow 1000 includes an operation 1004, where the computer system creates a snapshot of a standby volume system at a second geographic region. In some embodiments, updating the standby volume may be preceded by creating a snapshot of the standby volume. As described in more detail in reference to FIG. 1, creating a snapshot may include creating a plurality of block images of the blocks making up the standby volume, on a partition-wise basis. Assembled, these images may describe the state of data in the standby volume at a logical time corresponding to the creation of the snapshot (e.g., as described in reference to two-phase commit protocols, above). The snapshot may provide a fallback position for the asynchronous replication system to use when restoring the block volume system. For example, if a restore request is received while the standby volume is being updated with new deltas, the asynchronous replication may generate a restore volume using the snapshot.

In an example, the flow 1000 includes an operation 1006, where the computer system applies the delta to the standby volume system. In contrast to the approach described in reference to data replication using object storage, a standby volume may be updated by applying deltas directly. For example, as described in more detail in reference to FIG. 2, a delta may include metadata describing a location in memory of the block volume system (e.g., a block identifier) for data being replicated as a result of a modification. In this way, the modification may be made to the standby volume by applying the indicated modification from the delta.

In an example, the flow 1000 includes an operation 1008, where the computer system receives a failback request. As described above, the failback request may be received following a failure or other disruption of operation at the block volume system, such that the standby system may be used to generate a failback system after the disruption has been resolved.

In an example, the flow 1000 includes an operation 1010, where the computer system clones the standby volume. As described in more detail in reference to FIG. 5, cloning the standby volume (e.g., operation 524 of FIG. 5) may include creating a failback volume (e.g., failback volume 562 of FIG. 5) at the first geographic region (e.g., first data center 120 of FIG. 1) that may reproduce the structure of the standby volume (e.g., in terms of size, partitions, etc.).

In an example, the flow 1000 includes an operation 1012, where the computer system restores replicated data to the failback volume at the first geographic region. As described above, restoring the replicated data may include copying block data from the second geographic region to the first geographic region (also referred to as "hydrating") and mapping the block data to the failback volume. In some embodiments, input-output operations may commence on the failback volume once the replicated data is restored and/or while restoring the replicated data.

Figure 11:
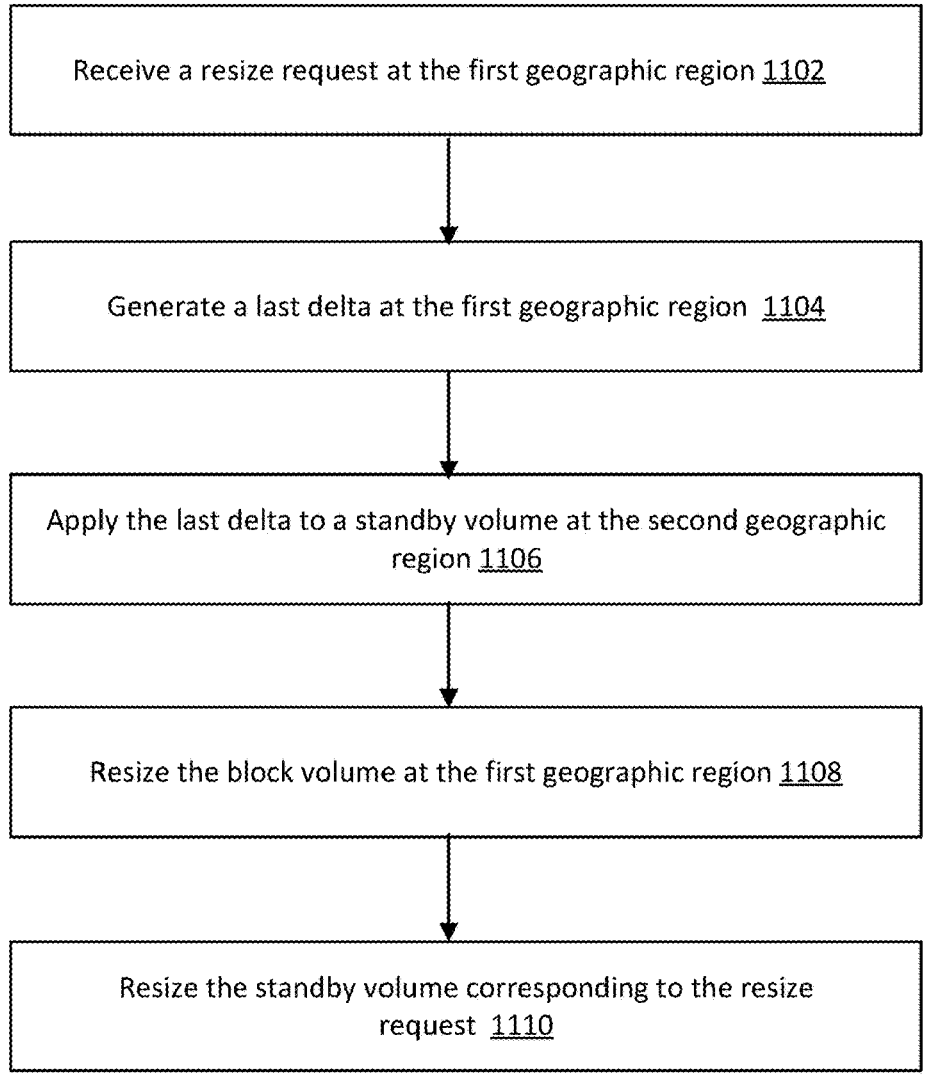
FIG. 11 illustrates an example flow for resizing a block volume system and a standby system, in accordance with one or more embodiments.

FIG. 11 illustrates an example flow 1100 for generating a failback volume, in accordance with one or more embodiments. The operations of the flow 1100 can be implemented as hardware circuitry and/or stored as computer-readable instructions on a non-transitory computer-readable medium of a computer system, such as the asynchronous replication system 140 of FIG. 1. As implemented, the instructions represent modules that include circuitry or code executable by a processor(s) of the computer system. The execution of such instructions configures the computer system to perform the specific operations described herein. Each circuitry or code in combination with the processor performs the respective operation(s). While the operations are illustrated in a particular order, it should be understood that no particular order is necessary and that one or more operations may be omitted, skipped, and/or reordered.

In an example, the flow 1100 includes an operation 1102, where the computer system receives a resize request at the first geographic region. During operation of the asynchronous replication system, for example, between iterations of snapshot creation, or during delta generation, the block volume system at the first geographic region may be subject to a resize request. Since the resize request may include addition and/or removal of one or more partitions, or changing the size of one or more partitions of the block volume system, deltas generated before the resize may be incompatible with the standby volume after it is resized.

In an example, the flow 1100 includes an operation 1104, where the computer system generates a last delta at the first geographic region. In some embodiments, the asynchronous replication system may implement a modified replication protocol in response to the receipt of the resize request by the block volume system. For example, rather than resize the block volume system immediately upon receipt of the resize request, another snapshot may be created and one or more last deltas generated. Such an approach may permit the replicated data to reflect an updated state of the block volume system prior to resizing, which may, in turn, reduce the RPO of a restore volume generated from the replicated data.

In an example, the flow 1100 includes an operation 1106, where the computer system applies the last delta to a standby volume at the second geographic region. Applying the last delta, as described above, may include modifying the standby volume to reflect the modifications to the block volume system described by the one or more last deltas generated in operation 1104.

In an example, the flow 1100 includes an operation 1108, where the computer system resizes the block volume at the first geographic region. Following operation 1104, the resize request may be applied to the block volume system.

In an example, the flow 1100 includes an operation 1110, where the computer system resizes the standby volume corresponding to the resize request. Similarly, following operation 1106, the standby volume may also be resized, in a manner corresponding to the resize request. Since asynchronous replication may generate deltas that are partition-specific, the standby volume may be structured to reproduce the structure of the block volume system. For example, the standby volume may include the same number of partitions of the same size as the block volume system.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 12:
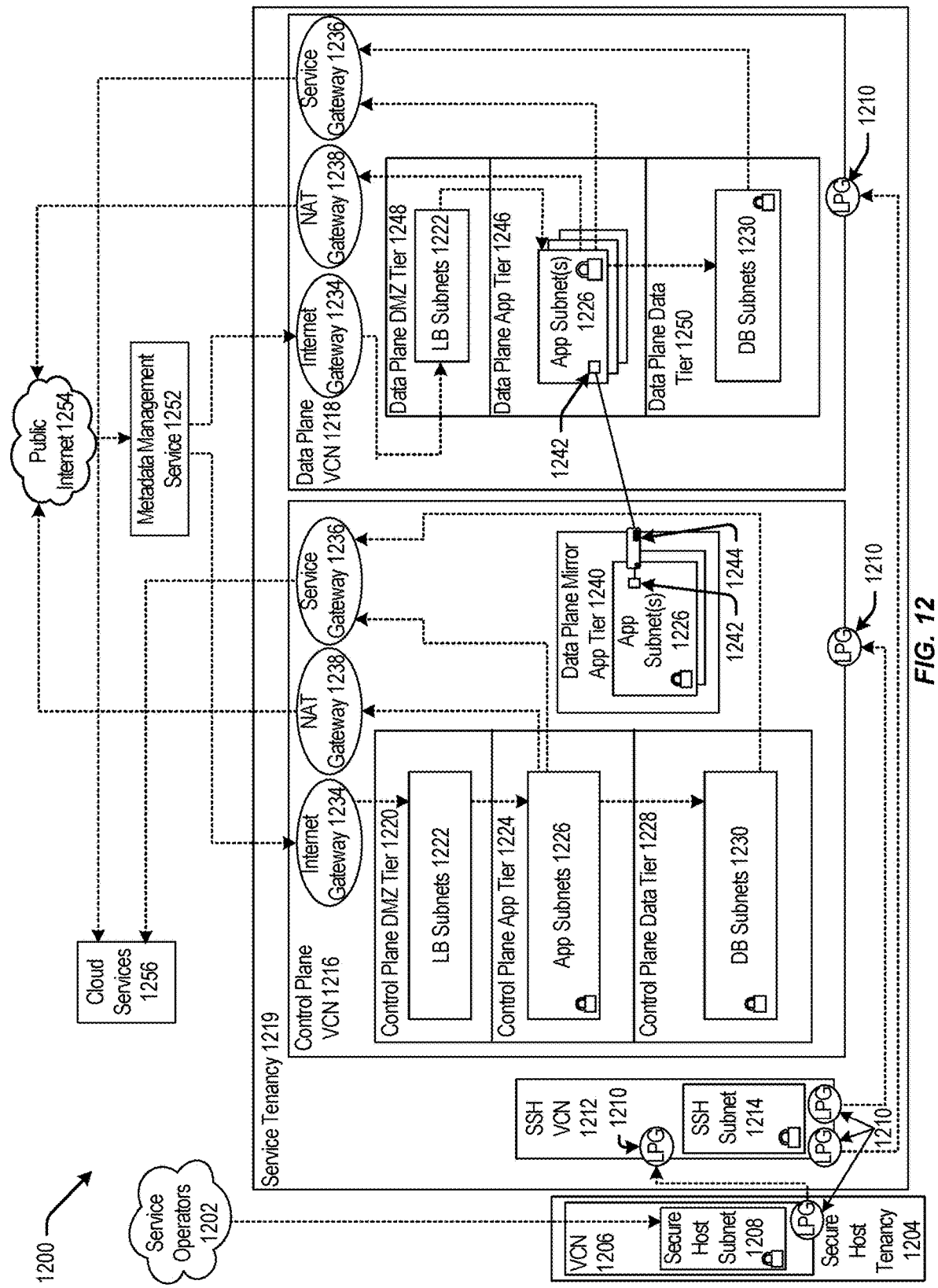
FIG. 12 is a block diagram illustrating one pattern for implementing a cloud infrastructure as a service system, according to at least one embodiment.

FIG. 12 is a block diagram 1200 illustrating an example pattern of an IaaS architecture, according to at least one embodiment. Service operators 1202 can be communicatively coupled to a secure host tenancy 1204 that can include a virtual cloud network (VCN) 1206 and a secure host subnet 1208. In some examples, the service operators 1202 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1206 and/or the Internet.

The VCN 1206 can include a local peering gateway (LPG) 1210 that can be communicatively coupled to a secure shell (SSH) VCN 1212 via an LPG 1210 contained in the SSH VCN 1212. The SSH VCN 1212 can include an SSH subnet 1214, and the SSH VCN 1212 can be communicatively coupled to a control plane VCN 1216 via the LPG 1210 contained in the control plane VCN 1216. Also, the SSH VCN 1212 can be communicatively coupled to a data plane VCN 1218 via an LPG 1210. The control plane VCN 1216 and the data plane VCN 1218 can be contained in a service tenancy 1219 that can be owned and/or operated by the IaaS provider.

The control plane VCN 1216 can include a control plane demilitarized zone (DMZ) tier 1220 that acts as a perimeter network (e.g., portions of a corporate network between the corporate intranet and external networks). The DMZ-based servers may have restricted responsibilities and help keep security breaches contained. Additionally, the DMZ tier 1220 can include one or more load balancer (LB) subnet(s) 1222, a control plane app tier 1224 that can include app subnet(s) 1226, a control plane data tier 1228 that can include database (DB) subnet(s) 1230 (e.g., frontend DB subnet(s) and/or backend DB subnet(s)). The LB subnet(s) 1222 contained in the control plane DMZ tier 1220 can be communicatively coupled to the app subnet(s) 1226 contained in the control plane app tier 1224 and an Internet gateway 1234 that can be contained in the control plane VCN 1216, and the app subnet(s) 1226 can be communicatively coupled to the DB subnet(s) 1230 contained in the control plane data tier 1228 and a service gateway 1236 and a network address translation (NAT) gateway 1238. The control plane VCN 1216 can include the service gateway 1236 and the NAT gateway 1238.

The control plane VCN 1216 can include a data plane mirror app tier 1240 that can include app subnet(s) 1226. The app subnet(s) 1226 contained in the data plane mirror app tier 1240 can include a virtual network interface controller (VNIC) 1242 that can execute a compute instance 1244. The compute instance 1244 can communicatively couple the app subnet(s) 1226 of the data plane mirror app tier 1240 to app subnet(s) 1226 that can be contained in a data plane app tier 1246.

The data plane VCN 1218 can include the data plane app tier 1246, a data plane DMZ tier 1248, and a data plane data tier 1250. The data plane DMZ tier 1248 can include LB subnet(s) 1222 that can be communicatively coupled to the app subnet(s) 1226 of the data plane app tier 1246 and the Internet gateway 1234 of the data plane VCN 1218. The app subnet(s) 1226 can be communicatively coupled to the service gateway 1236 of the data plane VCN 1218 and the NAT gateway 1238 of the data plane VCN 1218. The data plane data tier 1250 can also include the DB subnet(s) 1230 that can be communicatively coupled to the app subnet(s) 1226 of the data plane app tier 1246.

The Internet gateway 1234 of the control plane VCN 1216 and of the data plane VCN 1218 can be communicatively coupled to a metadata management service 1252 that can be communicatively coupled to public Internet 1254. Public Internet 1254 can be communicatively coupled to the NAT gateway 1238 of the control plane VCN 1216 and of the data plane VCN 1218. The service gateway 1236 of the control plane VCN 1216 and of the data plane VCN 1218 can be communicatively couple to cloud services 1256.

In some examples, the service gateway 1236 of the control plane VCN 1216 or of the data plan VCN 1218 can make application programming interface (API) calls to cloud services 1256 without going through public Internet 1254. The API calls to cloud services 1256 from the service gateway 1236 can be one-way: the service gateway 1236 can make API calls to cloud services 1256, and cloud services 1256 can send requested data to the service gateway 1236. But, cloud services 1256 may not initiate API calls to the service gateway 1236.

In some examples, the secure host tenancy 1204 can be directly connected to the service tenancy 1219, which may be otherwise isolated. The secure host subnet 1208 can communicate with the SSH subnet 1214 through an LPG 1210 that may enable two-way communication over an otherwise isolated system. Connecting the secure host subnet 1208 to the SSH subnet 1214 may give the secure host subnet 1208 access to other entities within the service tenancy 1219.

The control plane VCN 1216 may allow users of the service tenancy 1219 to set up or otherwise provision desired resources. Desired resources provisioned in the control plane VCN 1216 may be deployed or otherwise used in the data plane VCN 1218. In some examples, the control plane VCN 1216 can be isolated from the data plane VCN 1218, and the data plane mirror app tier 1240 of the control plane VCN 1216 can communicate with the data plane app tier 1246 of the data plane VCN 1218 via VNICs 1242 that can be contained in the data plane mirror app tier 1240 and the data plane app tier 1246.

In some examples, users of the system, or customers, can make requests, for example create, read, update, or delete (CRUD) operations, through public Internet 1254 that can communicate the requests to the metadata management service 1252. The metadata management service 1252 can communicate the request to the control plane VCN 1216 through the Internet gateway 1234. The request can be received by the LB subnet(s) 1222 contained in the control plane DMZ tier 1220. The LB subnet(s) 1222 may determine that the request is valid, and in response to this determination, the LB subnet(s) 1222 can transmit the request to app subnet(s) 1226 contained in the control plane app tier 1224. If the request is validated and requires a call to public Internet 1254, the call to public Internet 1254 may be transmitted to the NAT gateway 1238 that can make the call to public Internet 1254. Memory that may be desired to be stored by the request can be stored in the DB subnet(s) 1230.

In some examples, the data plane mirror app tier 1240 can facilitate direct communication between the control plane VCN 1216 and the data plane VCN 1218. For example, changes, updates, or other suitable modifications to configuration may be desired to be applied to the resources contained in the data plane VCN 1218. Via a VNIC 1242, the control plane VCN 1216 can directly communicate with, and can thereby execute the changes, updates, or other suitable modifications to configuration to, resources contained in the data plane VCN 1218.

In some embodiments, the control plane VCN 1216 and the data plane VCN 1218 can be contained in the service tenancy 1219. In this case, the user, or the customer, of the system may not own or operate either the control plane VCN 1216 or the data plane VCN 1218. Instead, the IaaS provider may own or operate the control plane VCN 1216 and the data plane VCN 1218, both of which may be contained in the service tenancy 1219. This embodiment can enable isolation of networks that may prevent users or customers from interacting with other users', or other customers', resources. Also, this embodiment may allow users or customers of the system to store databases privately without needing to rely on public Internet 1254, which may not have a desired level of security, for storage.

In other embodiments, the LB subnet(s) 1222 contained in the control plane VCN 1216 can be configured to receive a signal from the service gateway 1236. In this embodiment, the control plane VCN 1216 and the data plane VCN 1218 may be configured to be called by a customer of the IaaS provider without calling public Internet 1254. Customers of the IaaS provider may desire this embodiment since database(s) that the customers use may be controlled by the IaaS provider and may be stored on the service tenancy 1219, which may be isolated from public Internet 1254.

Figure 13:
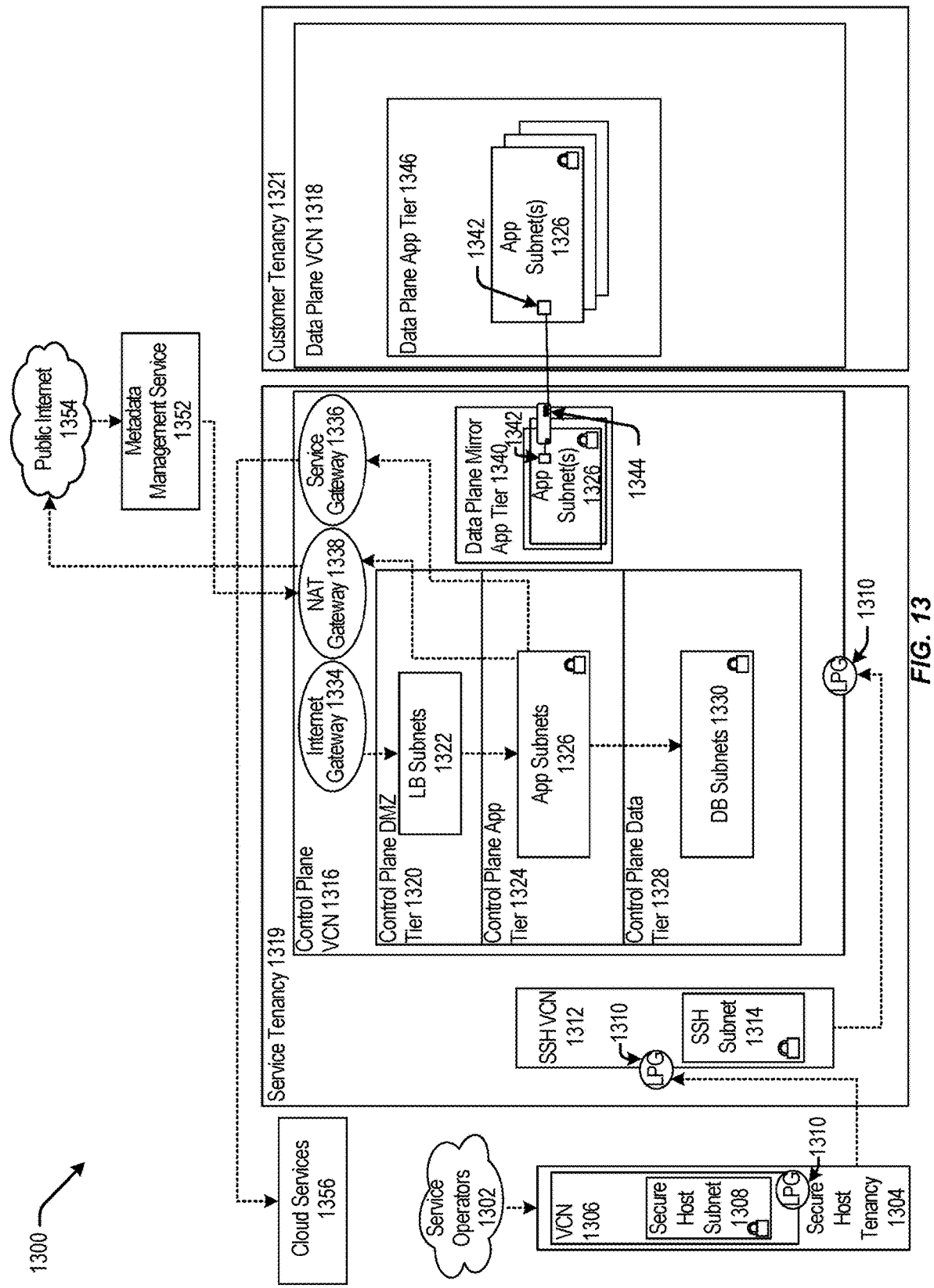
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g. service operators 1202 of FIG. 12) can be communicatively coupled to a secure host tenancy 1304 (e.g. the secure host tenancy 1204 of FIG. 12) that can include a virtual cloud network (VCN) 1306 (e.g. the VCN 1206 of FIG. 12) and a secure host subnet 1308 (e.g. the secure host subnet 1208 of FIG. 12). The VCN 1306 can include a local peering gateway (LPG) 1310 (e.g. the LPG 1210 of FIG. 12) that can be communicatively coupled to a secure shell (SSH) VCN 1312 (e.g. the SSH VCN 1212 of FIG. 12) via an LPG 1210 contained in the SSH VCN 1312. The SSH VCN 1312 can include an SSH subnet 1314 (e.g. the SSH subnet 1214 of FIG. 12), and the SSH VCN 1312 can be communicatively coupled to a control plane VCN 1316 (e.g. the control plane VCN 1216 of FIG. 12) via an LPG 1310 contained in the control plane VCN 1316. The control plane VCN 1316 can be contained in a service tenancy 1319 (e.g. the service tenancy 1219 of FIG. 12), and the data plane VCN 1318 (e.g. the data plane VCN 1218 of FIG. 12) can be contained in a customer tenancy 1321 that may be owned or operated by users, or customers, of the system.

The control plane VCN 1316 can include a control plane DMZ tier 1320 (e.g. the control plane DMZ tier 1220 of FIG. 12) that can include LB subnet(s) 1322 (e.g. LB subnet(s) 1222 of FIG. 12), a control plane app tier 1324 (e.g. the control plane app tier 1224 of FIG. 12) that can include app subnet(s) 1326 (e.g. app subnet(s) 1226 of FIG. 12), a control plane data tier 1328 (e.g. the control plane data tier 1228 of FIG. 12) that can include database (DB) subnet(s) 1330 (e.g. similar to DB subnet(s) 1230 of FIG. 12). The LB subnet(s) 1322 contained in the control plane DMZ tier 1320 can be communicatively coupled to the app subnet(s) 1326 contained in the control plane app tier 1324 and an Internet gateway 1334 (e.g. the Internet gateway 1234 of FIG. 12) that can be contained in the control plane VCN 1316, and the app subnet(s) 1326 can be communicatively coupled to the DB subnet(s) 1330 contained in the control plane data tier 1328 and a service gateway 1336 (e.g. the service gateway of FIG. 12) and a network address translation (NAT) gateway 1338 (e.g. the NAT gateway 1238 of FIG. 12). The control plane VCN 1316 can include the service gateway 1336 and the NAT gateway 1338.

The control plane VCN 1316 can include a data plane mirror app tier 1340 (e.g. the data plane mirror app tier 1240 of FIG. 12) that can include app subnet(s) 1326. The app subnet(s) 1326 contained in the data plane mirror app tier 1340 can include a virtual network interface controller (VNIC) 1342 (e.g. the VNIC of 1242) that can execute a compute instance 1344 (e.g. similar to the compute instance 1244 of FIG. 12). The compute instance 1344 can facilitate communication between the app subnet(s) 1326 of the data plane mirror app tier 1340 and the app subnet(s) 1326 that can be contained in a data plane app tier 1346 (e.g. the data plane app tier 1246 of FIG. 12) via the VNIC 1342 contained in the data plane mirror app tier 1340 and the VNIC 1342 contained in the data plan app tier 1346.

The Internet gateway 1334 contained in the control plane VCN 1316 can be communicatively coupled to a metadata management service 1352 (e.g. the metadata management service 1252 of FIG. 12) that can be communicatively coupled to public Internet 1354 (e.g. public Internet 1254 of FIG. 12). Public Internet 1354 can be communicatively coupled to the NAT gateway 1338 contained in the control plane VCN 1316. The service gateway 1336 contained in the control plane VCN 1316 can be communicatively couple to cloud services 1356 (e.g. cloud services 1256 of FIG. 12).

In some examples, the data plane VCN 1318 can be contained in the customer tenancy 1321. In this case, the IaaS provider may provide the control plane VCN 1316 for each customer, and the IaaS provider may, for each customer, set up a unique compute instance 1344 that is contained in the service tenancy 1319. Each compute instance 1344 may allow communication between the control plane VCN 1316, contained in the service tenancy 1319, and the data plane VCN 1318 that is contained in the customer tenancy 1321. The compute instance 1344 may allow resources, that are provisioned in the control plane VCN 1316 that is contained in the service tenancy 1319, to be deployed or otherwise used in the data plane VCN 1318 that is contained in the customer tenancy 1321.

In other examples, the customer of the IaaS provider may have databases that live in the customer tenancy 1321. In this example, the control plane VCN 1316 can include the data plane mirror app tier 1340 that can include app subnet(s) 1326. The data plane mirror app tier 1340 can reside in the data plane VCN 1318, but the data plane mirror app tier 1340 may not live in the data plane VCN 1318. That is, the data plane mirror app tier 1340 may have access to the customer tenancy 1321, but the data plane mirror app tier 1340 may not exist in the data plane VCN 1318 or be owned or operated by the customer of the IaaS provider. The data plane mirror app tier 1340 may be configured to make calls to the data plane VCN 1318 but may not be configured to make calls to any entity contained in the control plane VCN 1316. The customer may desire to deploy or otherwise use resources in the data plane VCN 1318 that are provisioned in the control plane VCN 1316, and the data plane mirror app tier 1340 can facilitate the desired deployment, or other usage of resources, of the customer.

In some embodiments, the customer of the IaaS provider can apply filters to the data plane VCN 1318. In this embodiment, the customer can determine what the data plane VCN 1318 can access, and the customer may restrict access to public Internet 1354 from the data plane VCN 1318. The IaaS provider may not be able to apply filters or otherwise control access of the data plane VCN 1318 to any outside networks or databases. Applying filters and controls by the customer onto the data plane VCN 1318, contained in the customer tenancy 1321, can help isolate the data plane VCN 1318 from other customers and from public Internet 1354.

In some embodiments, cloud services 1356 can be called by the service gateway 1336 to access services that may not exist on public Internet 1354, on the control plane VCN 1316, or on the data plane VCN 1318. The connection between cloud services 1356 and the control plane VCN 1316 or the data plane VCN 1318 may not be live or continuous. Cloud services 1356 may exist on a different network owned or operated by the IaaS provider. Cloud services 1356 may be configured to receive calls from the service gateway 1336 and may be configured to not receive calls from public Internet 1354. Some cloud services 1356 may be isolated from other cloud services 1356, and the control plane VCN 1316 may be isolated from cloud services 1356 that may not be in the same region as the control plane VCN 1316. For example, the control plane VCN 1316 may be located in "Region 1," and cloud service "Deployment 12," may be located in Region 1 and in "Region 2." If a call to Deployment 12 is made by the service gateway 1336 contained in the control plane VCN 1316 located in Region 1, the call may be transmitted to Deployment 12 in Region 1. In this example, the control plane VCN 1316, or Deployment 12 in Region 1, may not be communicatively coupled to, or otherwise in communication with, Deployment 12 in Region 2.

Figure 14:
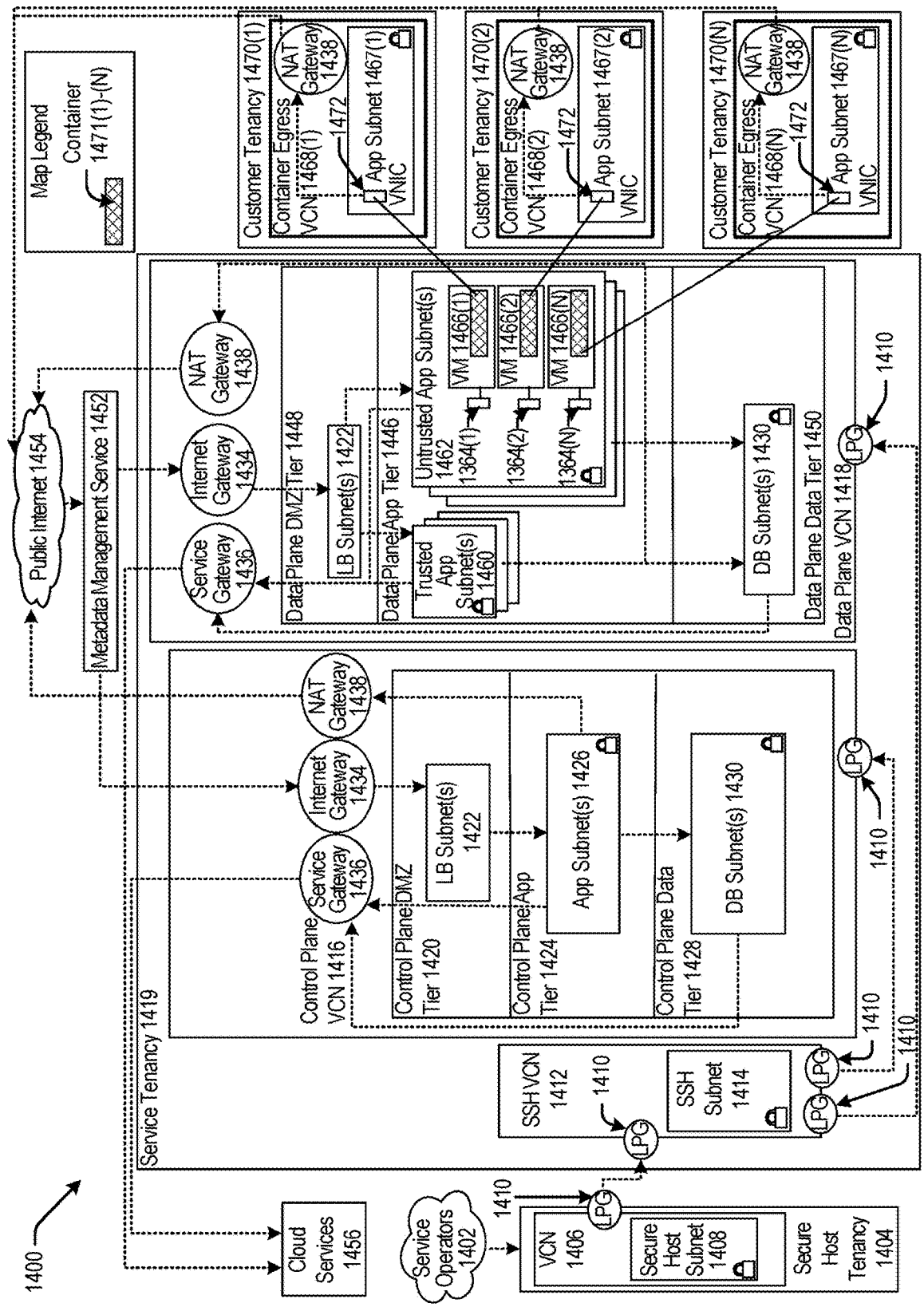
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g. service operators 1202 of FIG. 12) can be communicatively coupled to a secure host tenancy 1404 (e.g. the secure host tenancy 1204 of FIG. 12) that can include a virtual cloud network (VCN) 1406 (e.g. the VCN 1206 of FIG. 12) and a secure host subnet 1408 (e.g. the secure host subnet 1208 of FIG. 12). The VCN 1406 can include an LPG 1410 (e.g. the LPG 1210 of FIG. 12) that can be communicatively coupled to an SSH VCN 1412 (e.g. the SSH VCN 1212 of FIG. 12) via an LPG 1410 contained in the SSH VCN 1412. The SSH VCN 1412 can include an SSH subnet 1414 (e.g. the SSH subnet 1214 of FIG. 12), and the SSH VCN 1412 can be communicatively coupled to a control plane VCN 1416 (e.g. the control plane VCN 1216 of FIG. 12) via an LPG 1410 contained in the control plane VCN 1416 and to a data plane VCN 1418

(e.g. the data plane 1218 of FIG. 12) via an LPG 1410 contained in the data plane VCN 1418. The control plane VCN 1416 and the data plane VCN 1418 can be contained in a service tenancy 1419 (e.g. the service tenancy 1219 of FIG. 12).

The control plane VCN 1416 can include a control plane DMZ tier 1420 (e.g. the control plane DMZ tier 1220 of FIG. 12) that can include load balancer (LB) subnet(s) 1422 (e.g. LB subnet(s) 1222 of FIG. 12), a control plane app tier 1424 (e.g. the control plane app tier 1224 of FIG. 12) that can include app subnet(s) 1426 (e.g. similar to app subnet(s) 1226 of FIG. 12), a control plane data tier 1428 (e.g. the control plane data tier 1228 of FIG. 12) that can include DB subnet(s) 1430. The LB subnet(s) 1422 contained in the control plane DMZ tier 1420 can be communicatively coupled to the app subnet(s) 1426 contained in the control plane app tier 1424 and to an Internet gateway 1434 (e.g. the Internet gateway 1234 of FIG. 12) that can be contained in the control plane VCN 1416, and the app subnet(s) 1426 can be communicatively coupled to the DB subnet(s) 1430 contained in the control plane data tier 1428 and to a service gateway 1436 (e.g. the service gateway of FIG. 12) and a network address translation (NAT) gateway 1438 (e.g. the NAT gateway 1238 of FIG. 12). The control plane VCN 1416 can include the service gateway 1436 and the NAT gateway 1438.

The data plane VCN 1418 can include a data plane app tier 1446 (e.g. the data plane app tier 1246 of FIG. 12), a data plane DMZ tier 1448 (e.g. the data plane DMZ tier 1248 of FIG. 12), and a data plane data tier 1450 (e.g. the data plane data tier 1250 of FIG. 12). The data plane DMZ tier 1448 can include LB subnet(s) 1422 that can be communicatively coupled to trusted app subnet(s) 1460 and untrusted app subnet(s) 1462 of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include one or more primary VNICs 1464(1)-(N) that can be communicatively coupled to tenant virtual machines (VMs) 1466(1)-(N). Each tenant VM 1466(1)-(N) can be communicatively coupled to a respective app subnet 1467(1)-(N) that can be contained in respective container egress VCNs 1468(1)-(N) that can be contained in respective customer tenancies 1470(1)-(N). Respective secondary VNICs 1472(1)-(N) can facilitate communication between the untrusted app subnet(s) 1462 contained in the data plane VCN 1418 and the app subnet contained in the container egress VCNs 1468(1)-(N). Each container egress VCNs 1468(1)-(N) can include a NAT gateway 1438 that can be communicatively coupled to public Internet 1454 (e.g. public Internet 1254 of FIG. 12).

The Internet gateway 1434 contained in the control plane VCN 1416 and contained in the data plane VCN 1418 can be communicatively coupled to a metadata management service 1452 (e.g. the metadata management system 1252 of FIG. 12) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some embodiments, the data plane VCN 1418 can be integrated with customer tenancies 1470. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 1446. Code to run the function may be executed in the VMs 1466(1)-(N), and the code may not be configured to run anywhere else on the data plane VCN 1418. Each VM 1466(1)-(N) may be connected to one customer tenancy 1470. Respective containers 1471(1)-(N) contained in the VMs 1466(1)-(N) may be configured to run the code. In this case, there can be a dual isolation (e.g., the containers 1471(1)-(N) running code, where the containers 1471(1)-(N) may be contained in at least the VM 1466(1)-(N) that are contained in the untrusted app subnet(s) 1462), which may help prevent incorrect or otherwise undesirable code from damaging the network of the IaaS provider or from damaging a network of a different customer. The containers 1471(1)-(N) may be communicatively coupled to the customer tenancy 1470 and may be configured to transmit or receive data from the customer tenancy 1470. The containers 1471(1)-(N) may not be configured to transmit or receive data from any other entity in the data plane VCN 1418. Upon completion of running the code, the IaaS provider may kill or otherwise dispose of the containers 1471(1)-(N).

In some embodiments, the trusted app subnet(s) 1460 may run code that may be owned or operated by the IaaS provider. In this embodiment, the trusted app subnet(s) 1460 may be communicatively coupled to the DB subnet(s) 1430 and be configured to execute CRUD operations in the DB subnet(s) 1430. The untrusted app subnet(s) 1462 may be communicatively coupled to the DB subnet(s) 1430, but in this embodiment, the untrusted app subnet(s) may be configured to execute read operations in the DB subnet(s) 1430. The containers 1471(1)-(N) that can be contained in the VM 1466(1)-(N) of each customer and that may run code from the customer may not be communicatively coupled with the DB subnet(s) 1430.

In other embodiments, the control plane VCN 1416 and the data plane VCN 1418 may not be directly communicatively coupled. In this embodiment, there may be no direct communication between the control plane VCN 1416 and the data plane VCN 1418. However, communication can occur indirectly through at least one method. An LPG 1410 may be established by the IaaS provider that can facilitate communication between the control plane VCN 1416 and the data plane VCN 1418. In another example, the control plane VCN 1416 or the data plane VCN 1418 can make a call to cloud services 1456 via the service gateway 1436. For example, a call to cloud services 1456 from the control plane VCN 1416 can include a request for a service that can communicate with the data plane VCN 1418.

Figure 15:
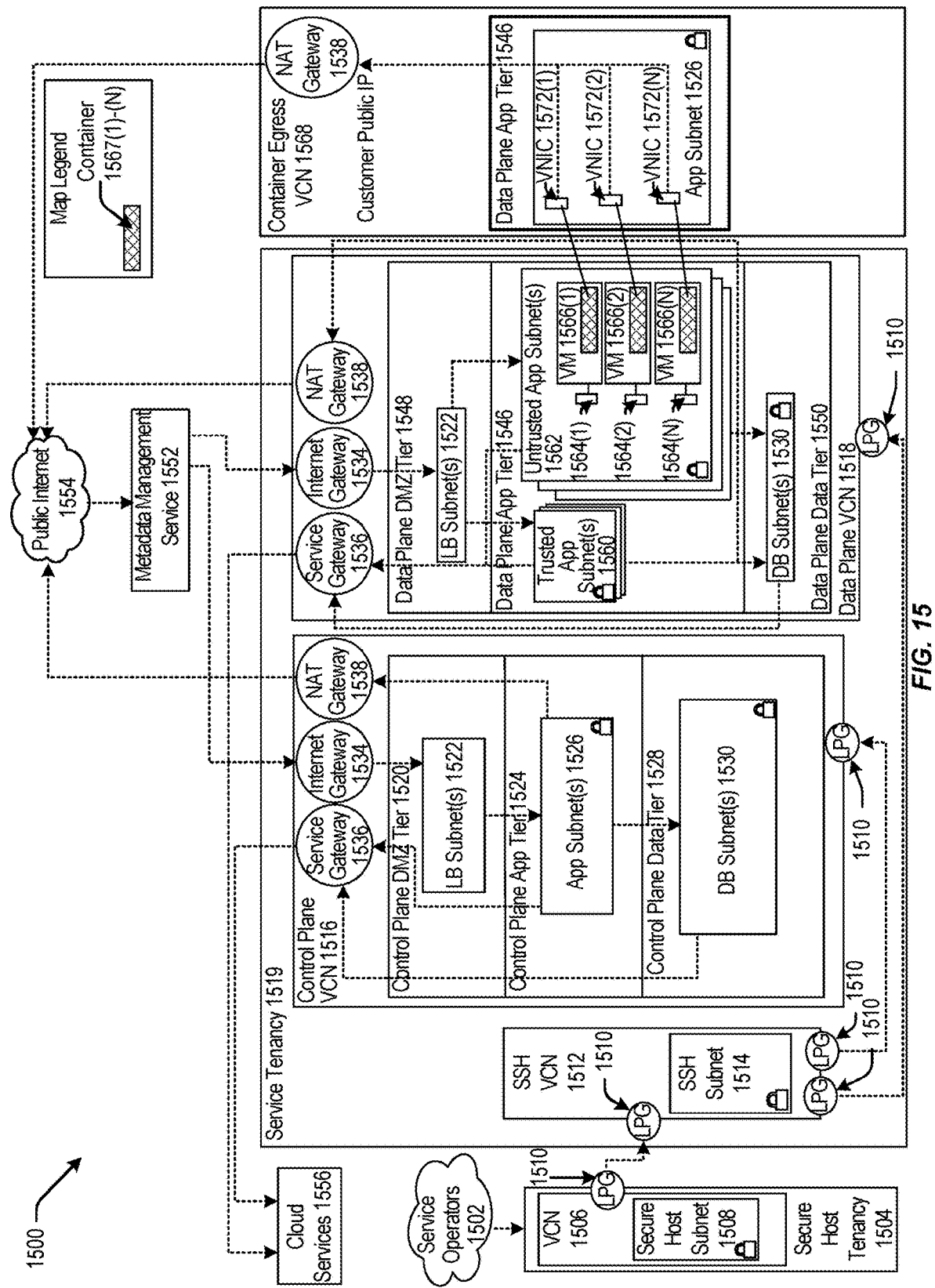
FIG. 15 is a block diagram illustrating another pattern for implementing a cloud infrastructure as a service system, according to at least one embodiment.

FIG. 15 is a block diagram 1500 illustrating another example pattern of an IaaS architecture, according to at least one embodiment. Service operators 1502 (e.g. service operators 1202 of FIG. 12) can be communicatively coupled to a secure host tenancy 1504 (e.g. the secure host tenancy 1204 of FIG. 12) that can include a virtual cloud network (VCN) 1506 (e.g. the VCN 1206 of FIG. 12) and a secure host subnet 1508 (e.g. the secure host subnet 1208 of FIG. 12). The VCN 1506 can include an LPG 1510 (e.g. the LPG 1210 of FIG. 12) that can be communicatively coupled to an SSH VCN 1512 (e.g. the SSH VCN 1212 of FIG. 12) via an LPG 1510 contained in the SSH VCN 1512. The SSH VCN 1512 can include an SSH subnet 1514 (e.g. the SSH subnet 1214 of FIG. 12), and the SSH VCN 1512 can be communicatively coupled to a control plane VCN 1516 (e.g. the control plane VCN 1216 of FIG. 12) via an LPG 1510 contained in the control plane VCN 1516 and to a data plane VCN 1518 (e.g. the data plane 1218 of FIG. 12) via an LPG 1510 contained in the data plane VCN 1518. The control plane VCN 1516 and the data plane VCN 1518 can be contained in a service tenancy 1519 (e.g. the service tenancy 1219 of FIG. 12).

The control plane VCN 1516 can include a control plane DMZ tier 1520 (e.g. the control plane DMZ tier 1220 of FIG. 12) that can include LB subnet(s) 1522 (e.g. LB subnet(s) 1222 of FIG. 12), a control plane app tier 1524 (e.g. the control plane app tier 1224 of FIG. 12) that can include app subnet(s) 1526 (e.g. app subnet(s) 1226 of FIG. 12), a control plane data tier 1528 (e.g. the control plane data tier 1228 of FIG. 12) that can include DB subnet(s) 1530 (e.g. DB subnet(s) 1430 of FIG. 14). The LB subnet(s) 1522 contained in the control plane DMZ tier 1520 can be communicatively coupled to the app subnet(s) 1526 contained in the control plane app tier 1524 and to an Internet gateway 1534 (e.g. the Internet gateway 1234 of FIG. 12) that can be contained in the control plane VCN 1516, and the app subnet(s) 1526 can be communicatively coupled to the DB subnet(s) 1530 contained in the control plane data tier 1528 and to a service gateway 1536 (e.g. the service gateway of FIG. 12) and a network address translation (NAT) gateway 1538 (e.g. the NAT gateway 1238 of FIG. 12). The control plane VCN 1516 can include the service gateway 1536 and the NAT gateway 1538.

The data plane VCN 1518 can include a data plane app tier 1546 (e.g. the data plane app tier 1246 of FIG. 12), a data plane DMZ tier 1548 (e.g. the data plane DMZ tier 1248 of FIG. 12), and a data plane data tier 1550 (e.g. the data plane data tier 1250 of FIG. 12). The data plane DMZ tier 1548 can include LB subnet(s) 1522 that can be communicatively coupled to trusted app subnet(s) 1560 (e.g. trusted app subnet(s) 1460 of FIG. 14) and untrusted app subnet(s) 1562 (e.g. untrusted app subnet(s) 1462 of FIG. 14) of the data plane app tier 1546 and the Internet gateway 1534 contained in the data plane VCN 1518. The trusted app subnet(s) 1560 can be communicatively coupled to the service gateway 1536 contained in the data plane VCN 1518, the NAT gateway 1538 contained in the data plane VCN 1518, and DB subnet(s) 1530 contained in the data plane data tier 1550. The untrusted app subnet(s) 1562 can be communicatively coupled to the service gateway 1536 contained in the data plane VCN 1518 and DB subnet(s) 1530 contained in the data plane data tier 1550. The data plane data tier 1550 can include DB subnet(s) 1530 that can be communicatively coupled to the service gateway 1536 contained in the data plane VCN 1518.

The untrusted app subnet(s) 1562 can include primary VNICs 1564(1)-(N) that can be communicatively coupled to tenant virtual machines (VMs) 1566(1)-(N) residing within the untrusted app subnet(s) 1562. Each tenant VM 1566(1)-(N) can run code in a respective container 1567(1)-(N), and be communicatively coupled to an app subnet 1526 that can be contained in a data plane app tier 1546 that can be contained in a container egress VCN 1568. Respective secondary VNICs 1572(1)-(N) can facilitate communication between the untrusted app subnet(s) 1562 contained in the data plane VCN 1518 and the app subnet contained in the container egress VCN 1568. The container egress VCN can include a NAT gateway 1538 that can be communicatively coupled to public Internet 1554 (e.g. public Internet 1254 of FIG. 12).

The Internet gateway 1534 contained in the control plane VCN 1516 and contained in the data plane VCN 1518 can be communicatively coupled to a metadata management service 1552 (e.g. the metadata management system 1252 of FIG. 12) that can be communicatively coupled to public Internet 1554. Public Internet 1554 can be communicatively coupled to the NAT gateway 1538 contained in the control plane VCN 1516 and contained in the data plane VCN 1518. The service gateway 1536 contained in the control plane VCN 1516 and contained in the data plane VCN 1518 can be communicatively couple to cloud services 1556.

In some examples, the pattern illustrated by the architecture of block diagram 1500 of FIG. 15 may be considered an exception to the pattern illustrated by the architecture of block diagram 1400 of FIG. 14 and may be desirable for a customer of the IaaS provider if the IaaS provider cannot directly communicate with the customer (e.g., a disconnected region). The respective containers 1567(1)-(N) that are contained in the VMs 1566(1)-(N) for each customer can be accessed in real-time by the customer. The containers 1567(1)-(N) may be configured to make calls to respective secondary VNICs 1572(1)-(N) contained in app subnet(s) 1526 of the data plane app tier 1546 that can be contained in the container egress VCN 1568. The secondary VNICs 1572(1)-(N) can transmit the calls to the NAT gateway 1538 that may transmit the calls to public Internet 1554. In this example, the containers 1567(1)-(N) that can be accessed in real-time by the customer can be isolated from the control plane VCN 1516 and can be isolated from other entities contained in the data plane VCN 1518. The containers 1567(1)-(N) may also be isolated from resources from other customers.

In other examples, the customer can use the containers 1567(1)-(N) to call cloud services 1556. In this example, the customer may run code in the containers 1567(1)-(N) that requests a service from cloud services 1556. The containers 1567(1)-(N) can transmit this request to the secondary VNICs 1572(1)-(N) that can transmit the request to the NAT gateway that can transmit the request to public Internet 1554. Public Internet 1554 can transmit the request to LB subnet(s) 1522 contained in the control plane VCN 1516 via the Internet gateway 1534. In response to determining the request is valid, the LB subnet(s) can transmit the request to app subnet(s) 1526 that can transmit the request to cloud services 1556 via the service gateway 1536.

It should be appreciated that IaaS architectures 1200, 1300, 1400, 1500 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 16:
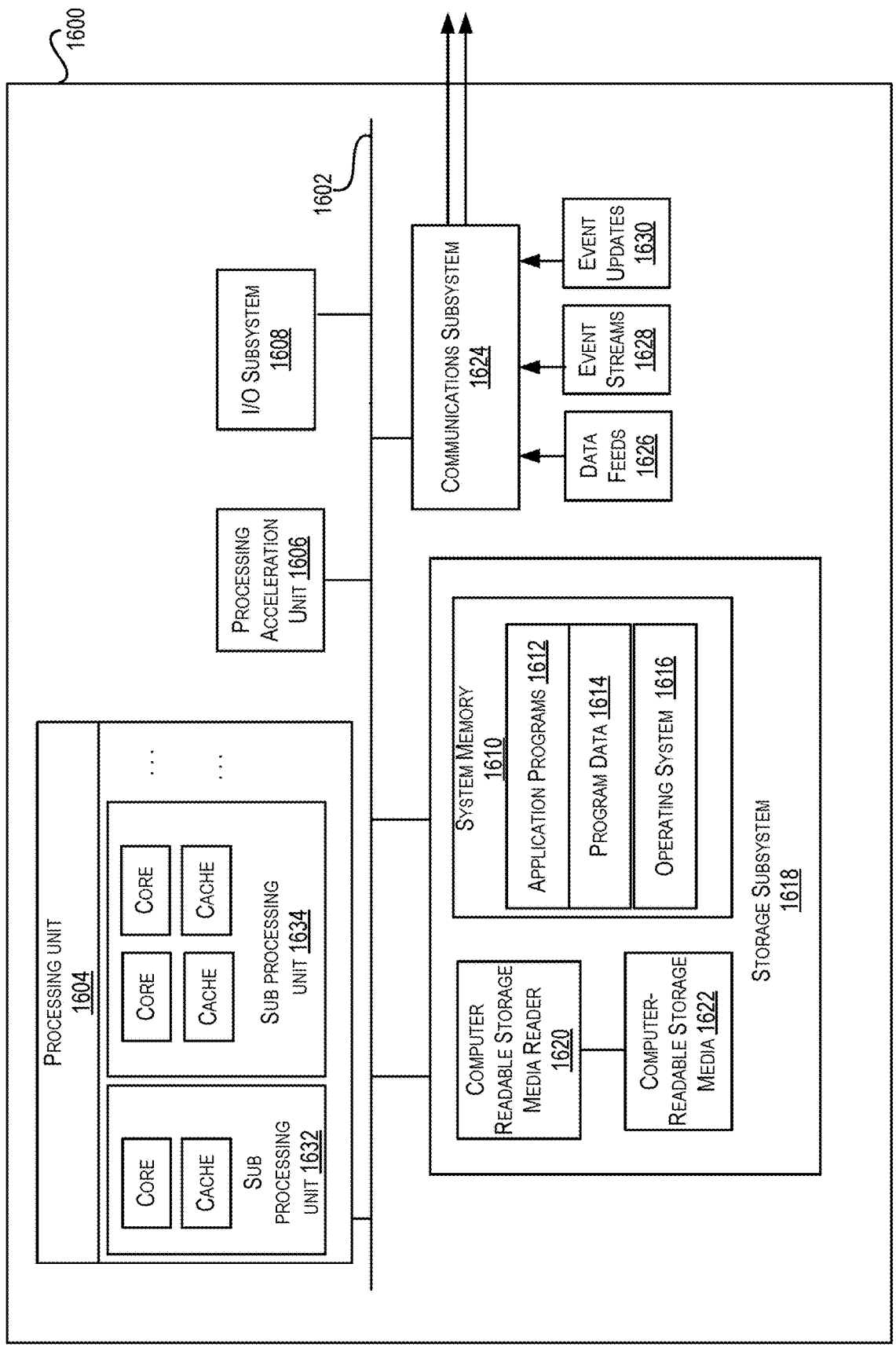
FIG. 16 is a block diagram illustrating an example computer system, according to at least one embodiment.

FIG. 16 illustrates an example computer system 1600, in which various embodiments of the present disclosure may be implemented. The system 1600 may be used to implement any of the computer systems described above. As shown in the figure, computer system 1600 includes a processing unit 1604 that communicates with a number of peripheral subsystems via a bus subsystem 1602. These peripheral subsystems may include a processing acceleration unit 1606, an I/O subsystem 1608, a storage subsystem 1618 and a communications subsystem 1624. Storage subsystem 1618 includes tangible computer-readable storage media 1622 and a system memory 1610.

Bus subsystem 1602 provides a mechanism for letting the various components and subsystems of computer system 1600 communicate with each other as intended. Although bus subsystem 1602 is shown schematically as a single bus, alternative embodiments of the bus subsystem may utilize multiple buses. Bus subsystem 1602 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1604, which can be implemented as one or more integrated circuits (e.g., a conventional microprocessor or microcontroller), controls the operation of computer system 1600. One or more processors may be included in processing unit 1604. These processors may include single core or multicore processors. In certain embodiments, processing unit 1604 may be implemented as one or more independent processing units 1632 and/or 1634 with single or multicore processors included in each processing unit. In other embodiments, processing unit 1604 may also be implemented as a quad-core processing unit formed by integrating two dual-core processors into a single chip.

In various embodiments, processing unit 1604 can execute a variety of programs in response to program code and can maintain multiple concurrently executing programs or processes. At any given time, some or all of the program code to be executed can be resident in processor(s) 1604 and/or in storage subsystem 1618. Through suitable programming, processor(s) 1604 can provide various functionalities described above. Computer system 1600 may additionally include a processing acceleration unit 1606, which can include a digital signal processor (DSP), a special-purpose processor, and/or the like.

I/O subsystem 1608 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1600 may comprise a storage subsystem 1618 that comprises software elements, shown as being currently located within a system memory 1610. System memory 1610 may store program instructions that are loadable and executable on processing unit 1604, as well as data generated during the execution of these programs.

Depending on the configuration and type of computer system 1600, system memory 1610 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1604. In some implementations, system memory 1610 may include multiple different types of memory, such as static random access memory (SRAM) or dynamic random access memory (DRAM). In some implementations, a basic input/output system (BIOS), containing the basic routines that help to transfer information between elements within computer system 1600, such as during start-up, may typically be stored in the ROM. By way of example, and not limitation, system memory 1610 also illustrates application programs 1612, which may include client applications, Web browsers, mid-tier applications, relational database management systems (RDBMS), etc., program data 1614, and an operating system 1616. By way of example, operating system 1616 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 16 OS, and Palm® OS operating systems.

Storage subsystem 1618 may also provide a tangible computer-readable storage medium for storing the basic programming and data constructs that provide the functionality of some embodiments. Software (programs, code modules, instructions) that when executed by a processor provide the functionality described above may be stored in storage subsystem 1618. These software modules or instructions may be executed by processing unit 1604. Storage subsystem 1618 may also provide a repository for storing data used in accordance with the present disclosure.

Storage subsystem 1600 may also include a computer-readable storage media reader 1620 that can further be connected to computer-readable storage media 1622. Together and, optionally, in combination with system memory 1610, computer-readable storage media 1622 may comprehensively represent remote, local, fixed, and/or removable storage devices plus storage media for temporarily and/or more permanently containing, storing, transmitting, and retrieving computer-readable information.

Computer-readable storage media 1622 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1600.

By way of example, computer-readable storage media 1622 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1622 may include, but is not limited to, Zip® drives, flash memory cards, universal serial bus (USB) flash drives, secure digital (SD) cards, DVD disks, digital video tape, and the like. Computer-readable storage media 1622 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1600.

Communications subsystem 1624 provides an interface to other computer systems and networks. Communications subsystem 1624 serves as an interface for receiving data from and transmitting data to other systems from computer system 1600. For example, communications subsystem 1624 may enable computer system 1600 to connect to one or more devices via the Internet. In some embodiments communications subsystem 1624 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1624 can provide wired network connectivity (e.g., Ethernet) in addition to or instead of a wireless interface.

In some embodiments, communications subsystem 1624 may also receive input communication in the form of structured and/or unstructured data feeds 1626, event streams 1628, event updates 1630, and the like on behalf of one or more users who may use computer system 1600.

By way of example, communications subsystem 1624 may be configured to receive data feeds 1626 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1624 may also be configured to receive data in the form of continuous data streams, which may include event streams 1628 of real-time events and/or event updates 1630, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1624 may also be configured to output the structured and/or unstructured data feeds 1626, event streams 1628, event updates 1630, and the like to one or more databases that may be in communication with one or more streaming data source computers coupled to computer system 1600.

Computer system 1600 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1600 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving a resize request for one or more partitions of a first plurality of partitions in a source volume of a first data center located in a first geographic region;
   in response to the resize request for the one or more partitions in the source volume:
      executing an update for data stored in a standby volume based on the source volume prior to resizing the one or more partitions in the source volume at least by:
         generating one or more deltas for the one or more partitions in the source volume of the first data center located in the first geographic region prior to resizing the one or more partitions in the source volume,
         wherein a delta, of the one or more deltas, corresponds to a difference between (a) a first state of a partition in the source volume of the first data center at a first point in time and (b) a second state of the partition in the source volume at a second point in time that is subsequent to the first point in time;
         applying an update based on the one or more deltas to one or more partitions of a second plurality of partitions in the standby volume of a second data center located in a second geographic region;
      resizing the one or more partitions in the source volume of the first data center located in the first geographic region based at least in part on the resize request; and
      resizing the one or more partitions in the standby volume of the second data center located in the second geographic region based at least in part on (a) the resize request for the one or more partitions in the source volume and/or (b) resizing of the one or more partitions in the source volume,
wherein the method is performed by a computing system including a hardware processor.

2. The method of claim 1, wherein the resize request corresponds to a request to add one or more partitions to the source volume.

3. The method of claim 1, wherein the resize request corresponds to a request to remove one or more partitions from the source volume.

4. The method of claim 1, wherein the resize request corresponds to a request to resize one or more partitions of the source volume.

5. The method of claim 1, wherein generating one or more deltas for the one or more partitions in the source volume of the first data center comprises:
creating a new snapshot of the source volume at the first data center; and
generating the one or more deltas based at least in part on the new snapshot of the source volume.

6. The method of claim 1, wherein the standby volume corresponds to a structure of the source volume of the first data center located at the first geographic region.

7. The method of claim 6, wherein the structure comprises at least one of a size of the source volume or a partitioning of the source volume.

8. The method of claim 1, wherein applying the update based on the one or more deltas to one or more partitions in a standby volume of a second data center located in a second geographic region comprises:
providing the one or more deltas to the second data center located in the second geographic region.

9. The method of claim 8, wherein the one or more deltas are provided to the second data center located in the second geographic region with any new data added to the source volume of the first data center located in the first geographic region.

10. The method of claim 8, wherein the one or more deltas are provided to the second data center located in the second geographic region with metadata that identifies any data removed from the source volume of the first data center located in the first geographic region.

11. A computing system including a hardware processor and configured to perform operations comprising:
receiving a resize request for one or more partitions of a first plurality of partitions in a source volume of a first data center located in a first geographic region;
in response to the resize request for the one or more partitions in the source volume;
executing an update for data stored in a standby volume based on the source volume prior to resizing the one or more partitions in the source volume at least by:
generating one or more deltas for the one or more partitions in the source volume of the first data center located in the first geographic region prior to resizing the one or more partitions in the source volume,
wherein a delta, of the one or more deltas, corresponds to a difference between (a) a first state of a partition in the source volume of the first data center at a first point in time and (b) a second state of the partition in the source volume at a second point in time that is subsequent to the first point in time;
applying an update based on the one or more deltas to one or more partitions of a second plurality of partitions in the standby volume of a second data center located in a second geographic region;
resizing the one or more partitions in the source volume of the first data center located in the first geographic region based at least in part on the resize request; and
resizing the one or more partitions in the standby volume of the second data center located in the second geographic region based at least in part on (a) the resize request for the one or more partitions in the source volume and/or (b) resizing of the one or more partitions in the source volume.

12. The computing system of claim 11, wherein the resize request corresponds to a request to add one or more partitions to the source volume.

13. The computing system of claim 11, wherein the resize request corresponds to a request to remove one or more partitions from the source volume.

14. The computing system of claim 11, wherein the resize request corresponds to a request to resize one or more partitions of the source volume.

15. The computing system of claim 11, wherein generating one or more deltas for the one or more partitions in the source volume of the first data center comprises:
creating a new snapshot of the source volume at the first data center; and
generating the one or more deltas based at least in part on the new snapshot of the source volume.

16. A non-transitory computer-readable medium, storing computer-executable instructions that, when executed, cause one or more processors of a computing system to perform operations comprising:
receiving a resize request for one or more partitions of a first plurality of partitions in a source volume of a first data center located in a first geographic region;
in response to the resize request for the one or more partitions in the source volume;
executing an update for data stored in a standby volume based on the source volume prior to resizing the one or more partitions in the source volume at least by:
generating one or more deltas for the one or more partitions in the source volume of the first data center located in the first geographic region prior to resizing the one or more partitions in the source volume,
wherein a delta, of the one or more deltas, corresponds to a difference between (a) a first state of a partition in the source volume of the first data center at a first point in time and (b) a second state of the partition in the source volume at a second point in time that is subsequent to the first point in time;
applying an update based on the one or more deltas to one or more partitions of a second plurality of partitions in the standby volume of a second data center located in a second geographic region;
resizing the one or more partitions in the source volume of the first data center located in the first geographic region based at least in part on the resize request; and
resizing the one or more partitions in the standby volume of the second data center located in the second geographic region based at least in part on (a) the resize request for the one or more partitions in the source volume and/or (b) resizing of the one or more partitions in the source volume.

17. The non-transitory computer-readable medium of claim 16, wherein the resize request corresponds to a request to add one or more partitions to the source volume.

18. The non-transitory computer-readable medium of claim 16, wherein the resize request corresponds to a request to remove one or more partitions from the source volume.

19. The non-transitory computer-readable medium of claim 16, wherein the resize request corresponds to a request to resize one or more partitions of the source volume.

20. The non-transitory computer-readable medium of claim 16, wherein generating one or more deltas for the one or more partitions in the source volume of the first data center comprises:
   creating a new snapshot of the source volume at the first data center; and
   generating the one or more deltas based at least in part on the new snapshot of the source volume.

* * * * *